(12) United States Patent
Mori et al.

(10) Patent No.: US 6,476,919 B1
(45) Date of Patent: Nov. 5, 2002

(54) POLARIZATION-INDEPENDENT REFLECTOMETRY AND POLARIZATION-INDEPENDENT REFLECTOMETER

(75) Inventors: Tohru Mori, Tokyo (JP); Kazumasa Takada, Tokyo (JP); Masaharu Horiguchi, Tokyo (JP)

(73) Assignees: Ando Electric Co., Ltd., Tokyo (JP); Nippon Telegraph and Telephone, Tokyo (JP); Ntt Electronics Corporation, Tokyo (JP)

( * ) Notice: Subject to any disclaimer, the term of this patent is extended or adjusted under 35 U.S.C. 154(b) by 0 days.

(21) Appl. No.: 09/404,810

(22) Filed: Sep. 24, 1999

(30) Foreign Application Priority Data

Sep. 25, 1998 (JP) ............................................. 10-271087

(51) Int. Cl.[7] ................................................. G01B 9/02
(52) U.S. Cl. ...................................... 356/479; 356/73.1
(58) Field of Search ................................. 356/479, 477, 356/497, 73.1

(56) References Cited

U.S. PATENT DOCUMENTS 5,202,745 A * 4/1993 Sorin et al. ................. 356/73.1

* cited by examiner

Primary Examiner—Frank G. Font
Assistant Examiner—Phil Natividad
(74) Attorney, Agent, or Firm—Finnegan, Henderson, Farabow, Garrett & Dunner LLP

(57) ABSTRACT

Emitted light from a light source 1 is separated into two parts through an optical fiber coupler 2, one is entered in a measured optical module 3 as measurement light, and the other is given a group delay by means of an optical fiber delay line 5, a reflector 25, etc., as local light signal, then the local light signal is combined with reflected light signal from the measured optical module 3 through an optical fiber coupler 21 and the reflected light signal and the local light signal are caused to interfere with each other. A polarization controller 100 comprising a polarizer and a polarization rotation device for arbitrarily rotating the polarization state 0 degrees and 90 degrees at the time is used to generate beat signals at the polarization rotation angles, and the sum of the intensities of the beat signals is found, making it possible to measure the light power of the reflected light signal regardless of the polarization state of the local light signal or reflected light signal.

10 Claims, 19 Drawing Sheets

POLARIZATION-INDEPENDENT REFLECTOMETRY AND POLARIZATION-INDEPENDENT REFLECTOMETER

BACKGROUND OF THE INVENTION

1. Field of the Invention

This invention relates to a reflectometry and a reflectometer for using low coherence light to measure a reflection intensity (distribution) in a measured optical circuit such as a optical waveguides or a optical module.

2. Description of the Related Art

FIG. 1 shows an example of a low-coherence reflectometer in a related art, here a low-coherence reflectometer based on a Michelson interferometer of optical fiber type. In the figure, numeral 1 denotes a light source made of a light-emitting diode for emitting low-coherence light having a polarization degree of 0.1, a spectral band width of 50 nm, and a center wavelength of 1.53 μn, numeral 2 denotes an optical fiber coupler having two input ports 2-1 and 2-2 and two output ports 2-3 and 2-4, numeral 3 denotes a measured optical module comprising an optical fiber pigtail 3a, numeral 4 denotes a polarization controller, numeral 5 denotes an optical fiber delay line made of an optical fiber coil, numeral 6 denotes a reflection mirror, numeral 7 denotes a linear stage, numeral 8 denotes a photodetector, numeral 9 denotes a signal processing system, numerals 10, 11, and 12 denote optical connectors, and numerals 13 and 14 denote collimating lenses.

In the described configuration, light emitted from the light source 1 is incident on the optical fiber coupler 2 through the input port 2-1 and is made to branch to the output ports 2-3 and 2-4. The light made to branch to the output port 2-3 is incident on the measured optical module 3 through the optical fiber pigtail 3a connected by the optical connector 10 as measurement light. The measurement light is reflected at each point responsive to the propagation distance of the measured optical module 3 and the reflected light signal propagates through the optical fiber pigtail 3a in the opposite direction and is incident on the output port 2-3.

On the other hand, the light made to branch to the output port 2-4 of the optical fiber coupler 2 passes through the polarization controller 4 and the optical fiber delay line 5, is made a collimated beam through the collimating lens 13, is reflected on the total reflection mirror 6, propagates through the path in the opposite direction, is incident on the output port 2-4 of the optical fiber coupler 2, and is used as local light signal.

Here, the optical fiber delay line 5 is provided for balancing the lengths of both arms of the Michelson interferometer of optical fiber type in response to the length of the optical fiber pigtail 3a connected to the measured optical module 3 and is replaced by means of the optical connectors 11 and 12 at both ends of the optical fiber delay line 5 whenever necessary.

The reflected light signal from the measured optical module 3 and the local light signal reflected on the total reflection mirror 6 are combined by the optical fiber coupler 2 and the mixed lightwave signal is emitted from the input port 2-2 and is made a collimated beam through the collimating lens 14, then the collimated beam is received at the photodetector 8. The beat signals of the reflected light signal and the local light signal received at the photodetector 8 and subjected to photoelectric conversion are processed by the signal processing system 9 and the reflection intensity of the measured optical module 3 is measured from the length of the signal.

In the reflectometer, the input port 2-1 of the optical fiber coupler 2 is connected to the light source 1, forming the light branch section, the input port 2-2 of the optical fiber coupler 2 is connected through the collimating lens 14 to the photodetector 8, forming the lightwave combining section, the output port 2-3 of the optical fiber coupler 2 forms the optical measurement block, and the output port 2-4 of the optical fiber coupler 2, the optical fiber delay line 5, the collimating lens 13, and the total reflection mirror 6 (containing the linear stage 7), forming the variable optical delay circuit; they make up the interferometer.

The coherence length of the emitted light from the light source 1 is about 40 μm. Thus, for the reflected light signal to be able to interfere with the local light signal with respect to a specific position of the total reflection mirror 6, the light path length of the reflected light signal needs to match the optical path length of the local light signal within the coherence length. Thus, if the total reflection mirror 6 is moved in the direction of light beams on the linear stage 7, only the interference beat signals of the reflected light signal at the points of the measured optical module 3 corresponding to the total reflection mirror positions in a one-to-one correspondence can be provided and the intensity of each beat signal is measured and is multiplied by an appropriate constant, whereby the light power of the reflected light signal can be found. The spatial resolution of the reflectometry is given as $\kappa c/n\delta v$ where $\kappa$ is a constant, $c$ is a light velocity, $n$ is a group index of measurement optical waveguide, and $\delta v$ is the full width at half maximum of spectrum of emitted light from a light source. If the spectrum of the emitted light from the light source is of Gauss type, $\kappa = 0.31$.

Since the low-coherence reflectometer uses light interference to measure the light power of reflected light signal, the polarization controller 6 needs to be used to make the polarization state of local light signal and that of the reflected light signal to match. In many cases, the optical fiber pigtail 3a is connected to the measured optical module 3 as shown in FIG. 1. If the measured optical module 3 is connected to one arm of the interferometer, the optical fiber delay line 5 needs to be connected to the other arm of the interferometer for balancing.

The polarization state of light propagating through the optical fiber changes according to bending of the fiber or the stress state. If the waveguide itself of the measured optical module has a double refraction property, the polarization state of light reflected at the points of the waveguide varies from one point to another. Therefore, to use different measured optical modules or optical fiber delay line or measure a optical waveguide having a double refraction property, the polarization controller needs to be used to adjust the polarization states of both; however, it is indispensable to eliminate the adjustment in order to save time and labor of measurement and realize fully automatic reflection measurement.

FIG. 2 shows an example of a low-coherence reflectometer in another related art, namely, a polarization-insensitive low-coherence reflectometer capable of measuring the reflection intensity of reflected light signal independently of the polarization state of the reflected light signal (namely, the light power of the reflected light signal). In the figure, numeral 15 denotes a polarizer, numeral 16 denotes a polarization beam splitter, numeral 17 denotes a photodetector, and numeral 18 denotes a signal processing system. Parts identical with those previously described with reference to FIG. 1 are denoted by the same reference numerals in FIG. 2.

In the example of the low-coherence reflectometer in the related art, a polarized wave diversity technology is adopted wherein local light signal and reflected light signal are separated into P wave and S wave by the polarization beam splitter 16, the reflected light signal and the local light signal are made to interface with each other in their respective polarization states, and the interference intensities of the beat signals of the reflected light signal and the local light signal are detected by photodetectors 8 and 17 and the signal processing system 18, and are added together.

Let the electric field elements of the P and S waves of the reflected light signal and the local light signal separated through the polarization beam splitter 16 be ($E_{rp}$, $E_{rs}$) and ($E_{Lp}$, $E_{Ls}$) respectively where the subscripts r and L denote the reflected light signal and the local light signal respectively.

Considering that the electric field elements of the reflected light signal and the local light signal are in a coherent state and the same phase in their respective polarized waves (P or S waves), the amplitudes of the interference beat components become $E_{rp}E_{Lp}^*$ and $E_{rs}E_{Ls}^*$ and the intensities of the beat signals are represented as $$I_p = \tfrac{1}{2} \cdot |E_{rp}E_{Lp}^*|^2$$
$$= \tfrac{1}{2} \cdot |E_{rp}|^2 |E_{Lp}|^2 \quad (1.1)$$
$$I_s = \tfrac{1}{2} \cdot |E_{rs}E_{Ls}^*|^2$$
$$= \tfrac{1}{2} \cdot |E_{rs}|^2 |E_{Ls}|^2 \quad (1.2)$$

From expressions (1.1) and (1.2), the sum of both intensities becomes $$I = I_p + I_s$$
$$= \tfrac{1}{2} \cdot (|E_{rp}|^2 |E_{Lp}|^2 + |E_{rs}|^2 |E_{Ls}|^2) \quad (2)$$

The intensities of the P and S waves of the local light signal are $|E_{Lp}|^2$ and $|E_{Ls}|^2$ and only if they equal $$|E_{Lp}|^2 = |E_{Ls}|^2 \quad (3)$$
$$I = \tfrac{1}{2} \cdot (|E_{rp}|^2 + |E_{rs}|^2) |E_{Lp}|^2 \quad (4)$$

That is, the sum total I becomes proportional to $|E_{rp}|^2$ and $|E_{rs}|^2$, the intensity of the reflected light signal, and the light power of the reflected light signal signal can be measured independently of the polarization state of the reflected light signal.

Since the emitted light from the light source is almost non-polarized light, the local light signal is allowed to pass through the polarizer 15 in order to polarize the local light signal. Since the emitted light from the light source is non-polarized light, even if the planes of polarization are rotated in an optical fiber delay line 5, the components of the light passing through the optical fiber delay line 5, orthogonal to each other equal unless a polarization dependent loss exists in the fiber. Thus, a half the power of collimated light can always pass through the polarizer 15. The light passing through the polarizer 15 is reflected on a total reflection mirror 6, passes through the polarizer 15, and propagates through the optical fiber delay line 5 and the output port 2-4 in the opposite direction again. Since local light signal just before it is separated through the polarization beam splitter 16 generally is put into elliptical polarization, it is necessary to adjust a polarization controller 4 so as to satisfy expression (3).

Because of the described configuration, if the optical fiber delay line 5 is installed on the side of the local light signal to balance the interferometer in response to the length of an optical fiber pigtail 3a connected to a measured optical module 3 and the polarization state of the local light signal is adjusted by the polarization controller 4, a light power distribution of the reflected light signal from the measured optical module 3, namely, a reflection distribution can be measured.

From the viewpoint of automating reflection measurement, the low-coherence reflectometer in FIG. 2 also has the following disadvantages:

It becomes necessary to adjust the polarization state of the local light signal by the polarization controller 4 each time the optical fiber delay line 5 connected to the side of the local light signal is replaced. The polarization state of the local light signal varies with different optical fiber delay lines. Thus, to automate the adjustment, it is necessary to provide the polarization controller with a mechanism capable of automatically rotating a half wavelength plate and a quarter wavelength plate at any desired angle and install a system for monitoring the distribution ratio of the polarization beam splitter with respect to each rotation angle of both the wavelength plates.

In the embodiments of the invention described with reference to FIG. 4 and later, to provide high sensitivity, a differential circuit is used to reduce intensity noise which is generated when detected of the low-coherence light; however, the differential circuit cannot be built in the low-coherence reflectometer shown in FIG. 2 for separating light through the polarization beam splitter.

From the described background, development of a low-coherence reflectometer which does not require a function for arbitrarily adjusting the polarization state if the optical fiber delay line is replaced, is released from polarization adjustment, and enables a differential circuit to be built in to provide high sensitivity is demanded strongly.

SUMMARY OF THE INVENTION

It is an object of the invention to provide a polarization independent reflectometry and a polarization independent reflectometer for providing a polarization adjustment free function capable of measuring a reflection intensity (distribution) of a measured optical circuit without adjusting the polarization state of an optical fiber delay line composed on the local light signal side and not requiring any polarization adjustment.

To solve the problems, the invention is characterized by the fact that a light source for emitting low-coherence light in an almost no polarization state is used, that emitted light from the light source is separated into two parts, one is entered in a measured optical circuit as measurement light, and the other is given a group delay that can be changed arbitrarily as local light signal, then the local light signal is combined with reflected light signal provided by reflecting the measurement light at each point responsive to the propagation distance of the measured optical circuit and the reflected light signal and the local light signal are caused to interfere with each other, and that a polarizer and a polarization rotation device for arbitrarily rotating the polarization state of propagation light 0 degrees and 90 degrees at the time are composed on either the path of the local light signal arriving at the lightwave combining section or the path of the reflected light signal arriving at the lightwave combining section, whereby the sum of the intensities of the interference beat signals at polarization rotation angles is found, making it possible to measure the light power of the reflected light signal from the measured optical circuit regardless of the state of the measured optical circuit or optical fiber delay line.

In the invention, a mechanism for rotating the polarization state 0 degrees and 90 is also required. However, electric or mechanical control determined for always providing only two states of 0 degrees and 90 degrees is only required whatever the measured optical circuit and optical fiber delay line are. It is not necessary to find the optimum state such that output reaches the maximum or that two components become equal while fining adjusting a polarization controller. For example, to a Faraday rotation element used with a polarization rotation device of the invention described with reference to FIG. 5, two determined electric currents may always be allowed to flow into a coil and intensities I0 and I90 of the interference beat signals measured for the current values may be added.

DETAILED DESCRIPTION OF THE PREFERRED EMBODIMENTS

The principle of the invention for enabling polarization-insensitive measurement will be discussed.

Figure 3:
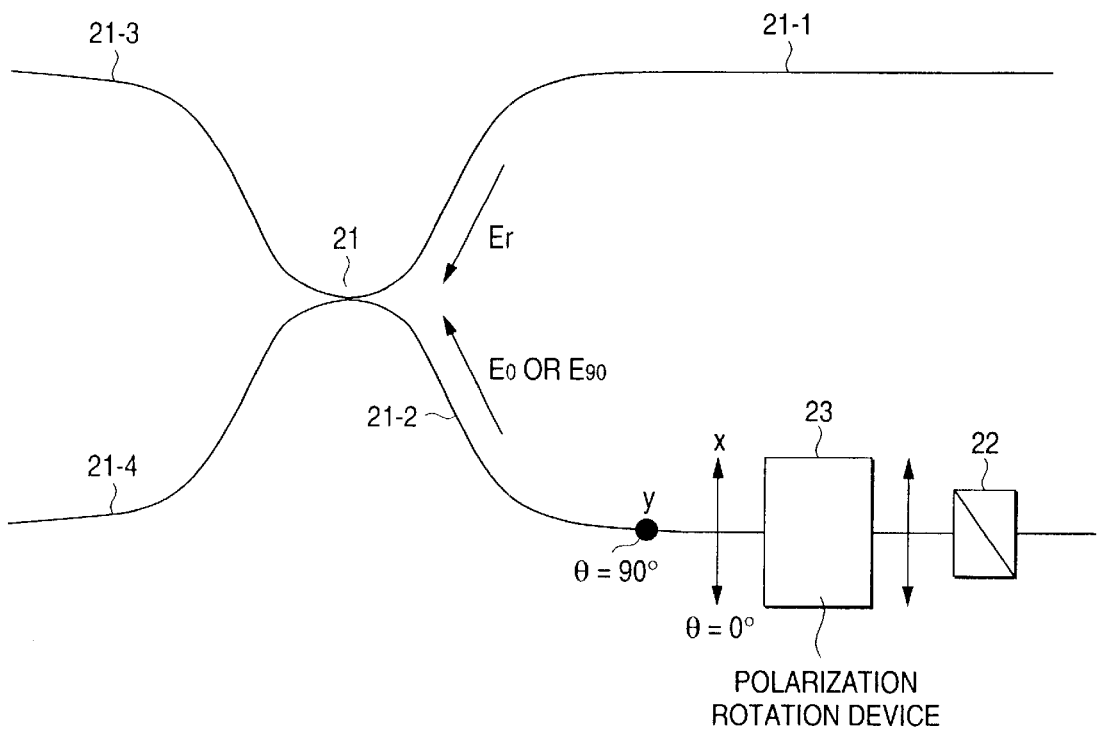
FIG. 3 is a drawing to show the main part of a reflectometer to describe the principle of the invention.

FIG. 3 is a drawing to show the main part of a reflectometer to describe the principle of the invention. In the figure, numeral 21 denotes an optical fiber coupler for combining lightwaves having two input ports 21-1 and 21-2 and two output ports 21-3 and 21-4, numeral 22 denotes a polarizer, and numeral 23 denotes a polarization rotation device.

Here, assume that reflected light signal from a optical measurement block containing a measured optical circuit (not shown) propagates to the input port 21-1 of the optical fiber coupler 21 and that local light signal from a variable optical delay circuit (not shown) propagates to the input port 21-2.

At this time, the polarizer 22 is fixed, thus it can be assumed that the polarization direction just after the local light signal is emitted from the polarization rotation device if the polarization rotation angle is $\theta=0°$ is a direction parallel to the plane of the figure. Thus, the polarization is represented by an arrow and the unit vector in the direction is x. Since the polarization of the local light signal when the polarization rotation angle is $\theta=90°$ becomes a direction perpendicular to the plane of the figure. Thus, the polarization is represented by a black circle and the unit vector in the direction is y.

Since the local light signal passing through the polarization rotation device propagates through the input port 21-2, the polarization state when the local light signal is combined with the reflected light signal from the input port 21-2 generally becomes elliptical polarization. The electric field vectors of the local light signal in the optical fiber coupler 21 corresponding to $\theta=0°$ and $\theta=90°$ are represented as $E_0 = E_L \cdot U \cdot x$ and $E_{90} = E_L \cdot U \cdot y$ using a 2×2 unitary matrix U where $E_L$ is the electric field width of the local light signal and it is assumed that the light loss at $\theta=0°$ is the same as that at $\theta=90°$.

Assuming that the electric field vector of the reflected light signal in the optical fiber coupler 21 is $E_r$, the intensities of the beat signals detected for the rotation angles are $$I_0 = \frac{1}{4} \cdot |(E_r, E_O^*)|^2$$

$$= \frac{1}{4} \cdot |E_L|^2 \Sigma E_{ra} E_{rb}^* U_{ax}^* U_{bx} \tag{5.1}$$

$$I_{90} = \frac{1}{4} \cdot |(E_r, E_{90}^*)|^2$$

$$= \frac{1}{4} \cdot |E_L|^2 \Sigma E_{ra} E_{rb}^* U_{ay}^* U_{by} \tag{5.2}$$

where (,) denotes the inner product of the vectors, $E_{ra}$ (a=x, y) denotes a (x, y) component of the electric field vector of the reflected light signal, $E_r$, and $U_{ab}$ (a, b=x, y) denotes (a, b) component of the unitary matrix U. Sum $\Sigma$ of expressions (5.1) and (5.2) is found for all combinations of a, b=x, y.

From expressions (5.1) and (5.2), the sum of $I_0$ and $I_{90}$ is represented as $$I = I_0 + I_{90}$$

$$= \frac{1}{4} \cdot |E_L|^2 \Sigma E_{ra} E_{rb}^* (U_{ax}^* U_{bx} + U_{ay}^* U_{by}) \tag{6}$$

Since U is a unitary matrix, using constants $\delta$ and $\epsilon$, $$U_{xx} = \delta$$

$$U_{xy} = -\epsilon^*$$

$$U_{yx} = \epsilon$$

$$U_{yy} = -\delta^*$$

$$|\delta|^2 + |\epsilon|^2 = 1$$

Using expression (7), it can be shown that in expression (6) is a 2×2 unit matrix with (a, b) as subscripts.

Thus, expression (6) is $$I = \frac{1}{4} \cdot |E_L|^2 \Sigma E_{ra} E_{ra}^*$$

$$= \frac{1}{4} \cdot |E_L|^2 |E_r|^2 \qquad (8)$$

The sum total I becomes proportional to the intensity of the reflected light signal, $|E_r|^2$, and it is made possible to measure the light power of the reflected light signal, namely, the reflection intensity simply by changing two polarizations at $\theta=0°$ and $\theta=90°$ independently of the polarization state of the reflected light signal or local light signal.

The described theory is applied when the polarizer 22 is disposed before the polarization rotation device 23. If the polarizer 22 is disposed just after the polarization rotation device 23 or if only the polarizer is disposed in the input port 21-1, expression (8) can be provided. Thus, the polarizer and the polarization rotation device may be composed either on the path from the variable optical delay circuit to the lightwave combining section or the path from the optical measurement block to the lightwave combining section (except light reciprocating parts because polarization control executed by the polarizer and the polarization rotation device is received twice at the light reciprocating part).

The information on representing the polarization state of light propagating through an optical fiber using a unitary matrix is provided in, for example, A. D. Kersey, M. J. Marrone, and M. A. Davis, "Polarization-insensitive fiber optic Michelson interferometer," Electron. Lett., vol.27, pp.518–520 (1991).

Hereinafter, a description will be given in more detail of preferred embodiments of the invention with reference to the accompanying drawings.

Figure 1:
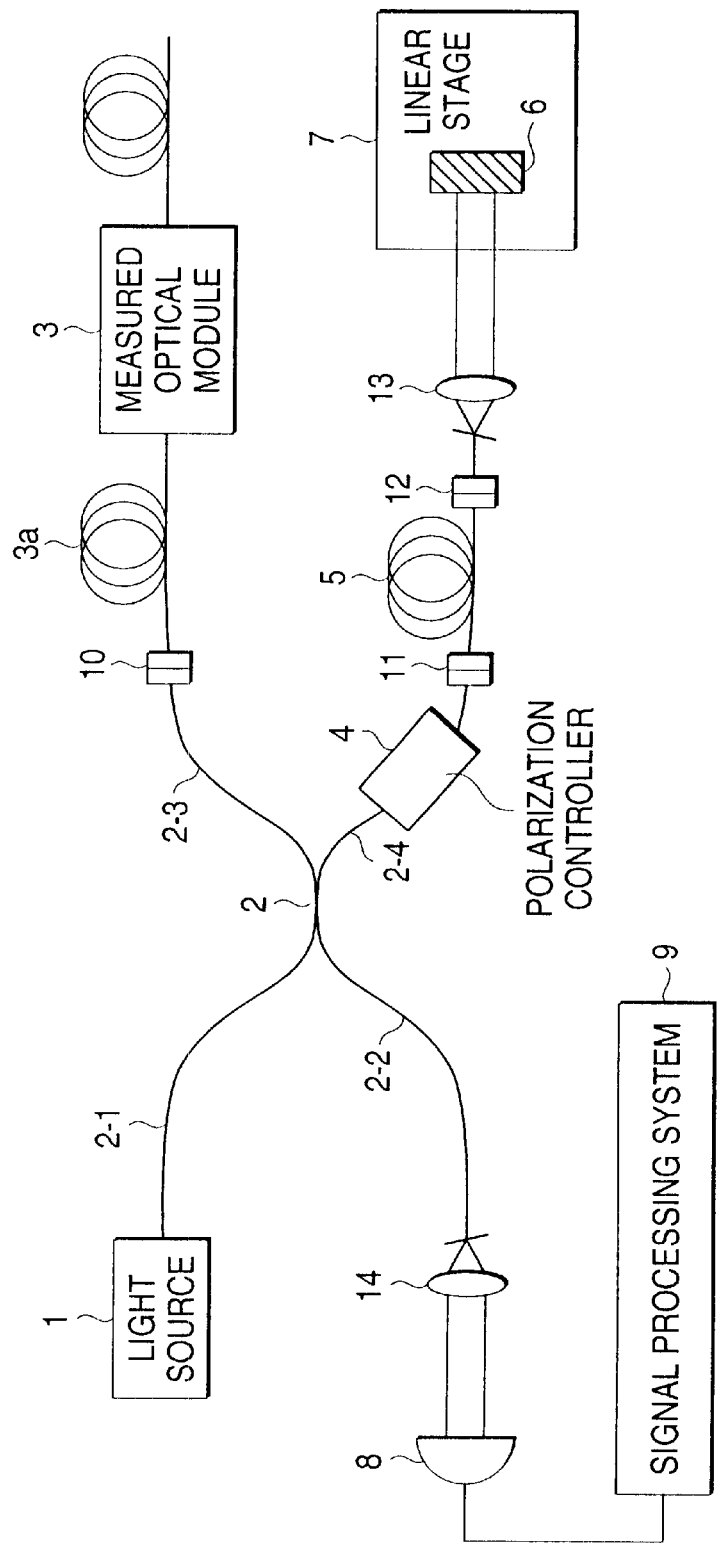
FIG. 1 is a drawing to show an example of a low-coherence reflectometer in a related art.
Figure 2:
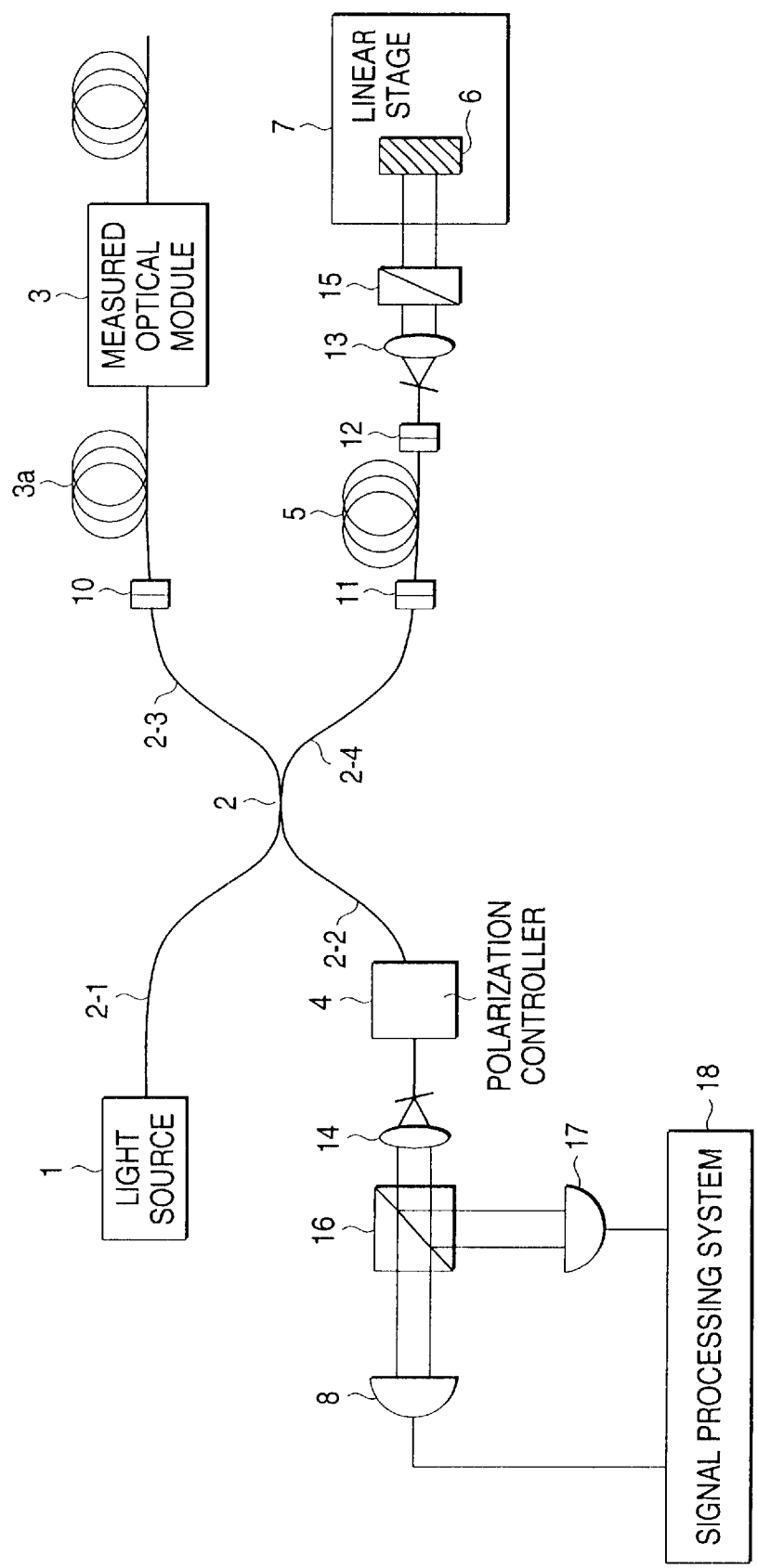
FIG. 2 is a drawing to show an example of a low-coherence reflectometer in another related art.
Figure 4:
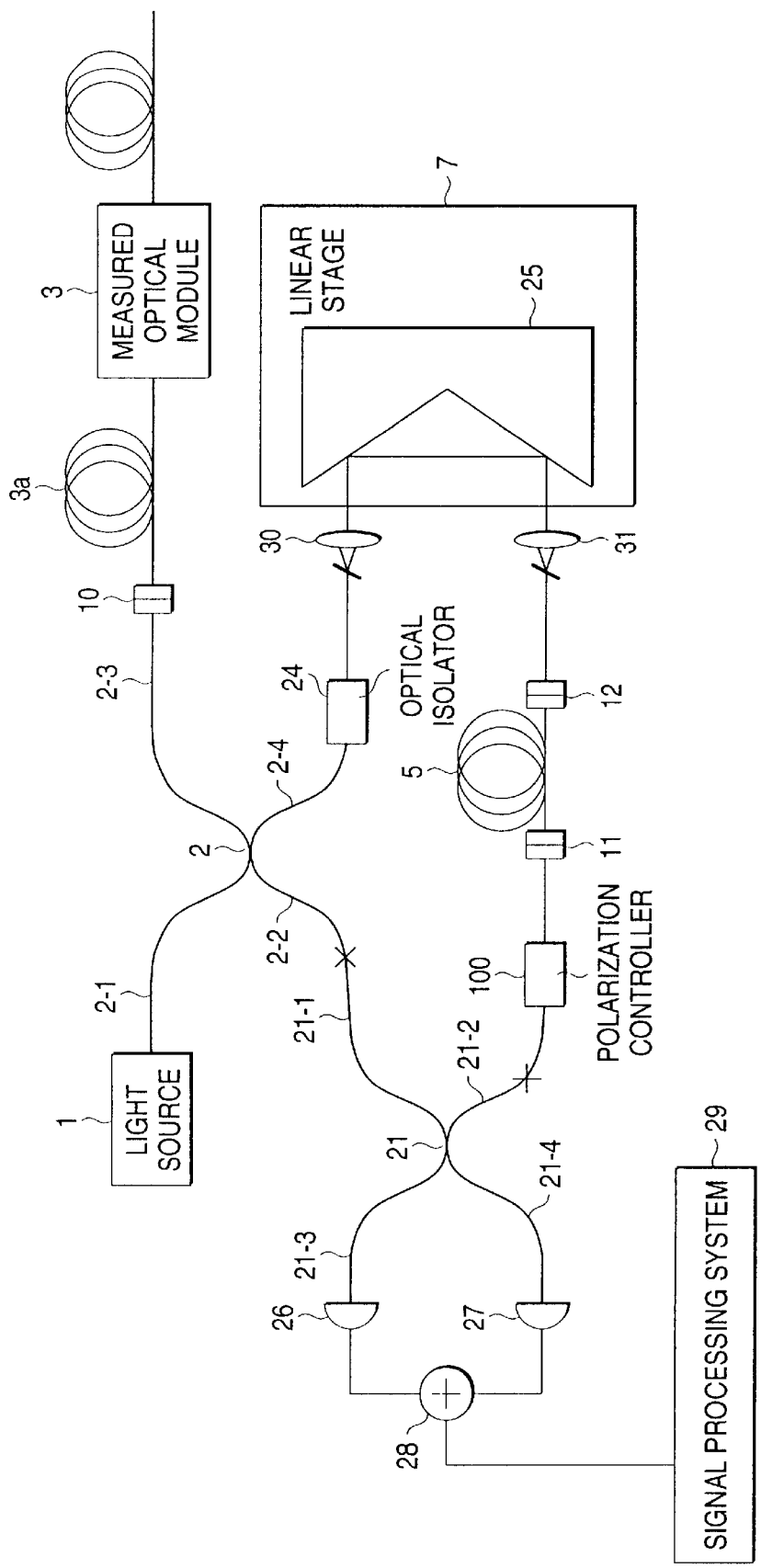
FIG. 4 is a drawing to show a first embodiment of a polarization independent reflectometer of the invention.

FIG. 4 shows a first embodiment of a polarization independent reflectometer of the invention. Parts identical with those previously described with reference to FIGS. 1 to 3 are denoted by the same reference numerals in FIG. 4. That is, numeral 1 denotes a light source, numeral 2 denotes an optical fiber coupler, numeral 3 denotes a measured optical module, numeral 5 denotes an optical fiber delay line, numeral 7 denotes a linear stage, numerals 10, 11, and 12 denote optical connectors, numeral 21 denotes an optical fiber coupler, numeral 24 denotes a optical isolator, 25 denotes a reflector, numerals 26 and 27 denote photodetectors, numeral 28 denotes a differential circuit, numeral 29 denotes a signal processing system, numerals 30 and 31 denote collimating lenses, and numeral 100 denotes a polarization controller comprising a polarizer and a polarization rotation device in one piece.

In the configuration, an input port 2-2 of the optical fiber coupler 2 and an input port 21-1 of the optical fiber coupler 21 are connected and the polarization controller 100 is connected to an input port 21-2 of the optical fiber coupler 21 (the connection points are indicated by X). An output port 2-4 of the optical fiber coupler 2 is connected to the polarization controller 100 through the optical isolator 24, the collimating lens 30, the reflector 25, the collimating lens 31, and the optical fiber delay line 5.

In the described configuration, light emitted from the light source 1 is incident on the optical fiber coupler 2 through the input port 2-1 and is made to branch to output ports 2-3 and 2-4. The light made to branch to the output port 2-3 is incident on the measured optical module 3 through an optical fiber pigtail 3a connected by the optical connector 10 as measurement light. The measurement light is reflected at each point responsive to the propagation distance of the measured optical module 3 and the reflected light signal propagates through the optical fiber pigtail 3a in the opposite direction and is incident on the output port 2-3, then is emitted from the input port 2-2 of the optical fiber coupler 2.

On the other hand, the light made to branch to the output port 2-4 of the optical fiber coupler 2 propagates through the optical isolator, is made a collimated beam through the collimating lens 30, is reflected on the reflector 25, and is diverted 180 degrees in the propagation direction, then is condensed through the collimating lens 31, propagates through the optical fiber delay line 5 and the polarization controller 100, is incident on the input port 21-2 of the optical fiber coupler 21, and is used as local light signal.

The local light signal is converted into linearly polarized light by the polarizer in the polarization controller 100 and undergoes polarization rotation with $\theta=0°$ or $\theta=90°$.

The reflected light signal from the measured optical module 3 and the local light signal diverted 180 degrees on the reflector 25 are combined by the optical fiber coupler 21 and the mixed lightwave signal is distributed to the output ports 21-3 and 21-4 and received at the photodetectors 26 and 27. The differential circuit 28 finds the difference between the two beat signals of the photoelectric converted reflecttion light signal and the local light signal received at the photodetectors 26 and 27, cancels intensity noise of light, and improves the sensitivity, then outputs the result to the signal processing system 29.

The reflector 25 is moved in the beam direction on the linear stage 7, whereby the group delay of the local light signal is changed. The signal processing system 29 measures the intensities of beat signals I0 and I90 responsive to the polarization rotation with $\theta=0°$ and $\theta=90°$ with respect to the positions of the reflectors 25 and calculates the sum of the signals, I0+I90, whereby the light power of the reflected light signal responsive to the points of the measured optical module 3 can be measured independently of the polarization state of the reflected light signal or the local light signal, and the reflection distribution can be measured.

In the reflectometer, the input port 2-1 of the optical fiber coupler 2 is connected to the light source 1, forming the light branch section, the output ports 21-3 and 21-4 of the optical fiber coupler 21 are connected to the photodetectors 26 and 27, forming the lightwave combining section, the output port 2-3 and the input port 2-2 of the optical fiber coupler 2 and the input port 21-1 of the optical fiber coupler 21 form the optical measurement block, and the output port 2-4 of the optical fiber coupler 2, the optical isolator 24, the collimating lens 30, the reflector 25 (containing the linear stage 7), the collimating lens 31, the optical fiber delay line 5, and the input port 21-2 of the optical fiber coupler 21 form the variable optical delay circuit; they make up the interferometer.

In the embodiment, the optical fiber couplers 2 and 21 with the polarization dependent loss of the branching ratio, 0.1 dB or less, are used to construct the interferometer. Thus, if the emitted light from the light source 1 propagates through the interferometer, the polarization degree remains 0.1.

In the embodiment, the polarization controller 100 is disposed between the input port 21-2 of the optical fiber coupler 21 and the optical fiber delay line 5, but a similar result can be provided if the polarization controller 100 is disposed at any part of the path from the variable optical delay circuit to the lightwave combining section, such as a part between the output port 2-4 of the optical fiber coupler 2 and the optical isolator 24, between the optical isolator 24 and the collimating lens 30, or between the collimating lens 31 and the optical fiber delay line 5, (except light reciprocating parts (which do not exist in the example); a similar result can be provided if the polarization controller 100 is disposed at any part of the path from the optical measurement block to the lightwave combining section, such as a part between the input port 21-1 of the optical fiber coupler 21 and the output port 2-2 of the optical fiber coupler 2, (except light reciprocating parts (in the example, between the output port 2-3 of the optical fiber coupler 2.and the measured optical module 3).

Figure 5:
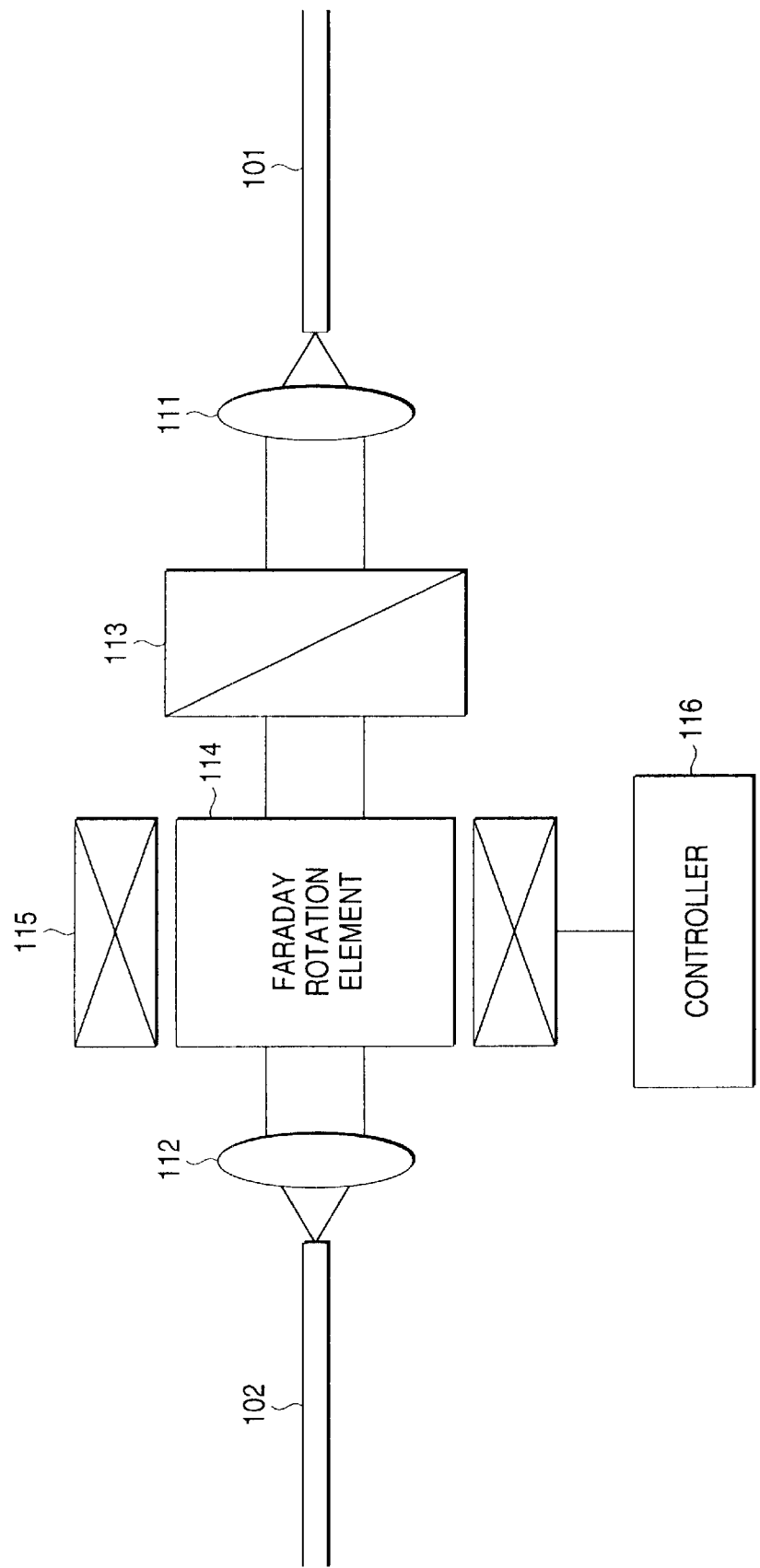
FIG. 5 is a drawing to show a first specific example of a polarization controller in FIG. 4.

FIG. 5 shows a first specific example of the polarization controller 100 shown in FIG. 4. In FIG. 5, numerals 101 and 102 denote optical fiber pigtails, numerals 111 and 112 denote collimating lenses, numeral 113 denotes a polarizer, numeral 114 denotes a Faraday rotation element, numeral 115 denotes a coil, and numeral 116 denotes a controller for controlling an electric current to the coil 115.

Emitted light from the optical fiber pigtail 101 is converted into a collimated beam through the collimating lens 111. Since the collimated beam has a polarization degree of 0.1 and is almost non-polarized light, a half the light power can pass through the polarizer 113 and the light power that can pass through does not depend on the state of the optical fiber delay line or any other portion of the optical fiber. The collimated beam becoming linearly polarized light propagates through the Faraday rotation element 114, then is condensed through the collimating lens 112 and is incident on the optical fiber pigtail 102.

Here, if an electric current is not made to flow into the coil 115 surrounding the Faraday rotation element 114, the linearly polarized light remains the linearly polarized light passing through the polarizer 113 and is incident on the optical fiber pigtail 102. If an electric current from the controller 116 is made to flow into the coil 115, a magnetic field is applied in the length direction of the Faraday rotation element 114 and the linearly polarized wave direction of propagating light rotates. If it is assumed that a current of 35 mA is made to flow into a coil, linearly polarized light can be rotated 90 degrees, the direction of the linearly polarized light incident on the optical fiber pigtail 102 can be set $\theta=0°$ or $\theta=90°$ by setting the current poured into the coil 115 to 0 or 35 mA.

Figure 6:
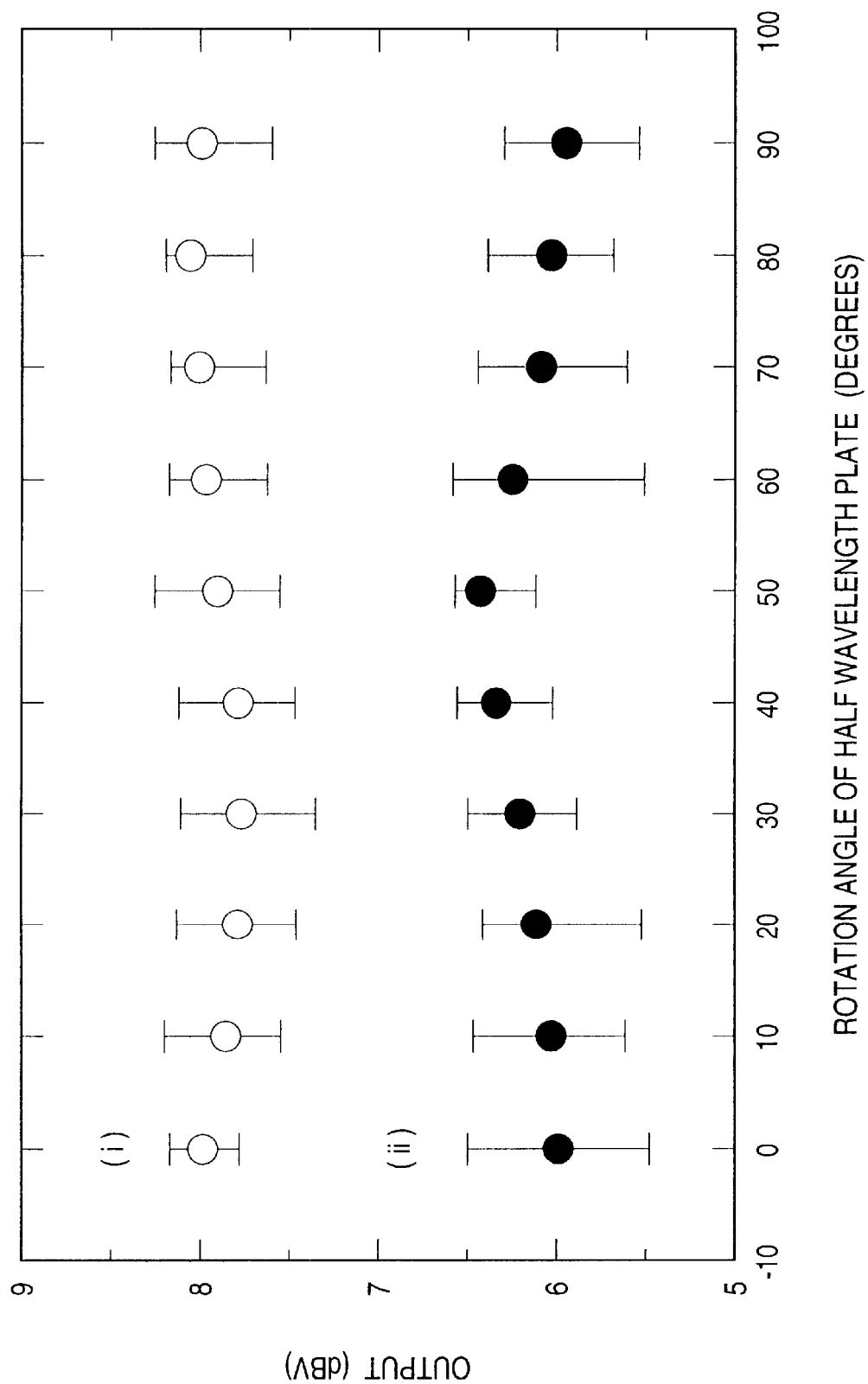
FIG. 6 is a drawing to show the measurement result of change in a Fresnel reflection signal when the polarization state of local light signal is changed.

In the first embodiment of the invention shown in FIG. 4, to find change in the measurement (beat) signal when the relative polarization state between reflected light signal and local light signal changes, a polarization controller comprising a half wavelength plate and a quarter wavelength plate is disposed between the polarization controller 100 and the optical fiber delay line 5 and the rotation angles of the wavelength plates are changed in steps of 10 degrees, then change in a Fresnel reflection signal from one point in the measured optical module is measured. FIG. 6 shows the result of the measurement.

FIG. 6 plots the range in which the Fresnel reflection signal changes with rotation of the half wavelength plate with respect to each rotation angle of the quarter wavelength plate. In the figure, (i) and (ii) show the results when the wavelengths of the light source 1 are set to 1.3 $\mu$m and 1.53 $\mu$m respectively.

As seen in FIG. 6, if the wavelength plates are rotated, change in the Fresnel reflection signal is suppressed within ±0.5 dB at both wavelengths. If optical fiber delay lines are replaced in response to measurement of various types of measured optical modules and the relative polarization state between reflected light signal and local light signal changes, the reflected light signal power at each reflection point can be measured with an error of ±0.5 dB or less.

In FIG. 5, letting the maximum power and minimum power of light that can pass through the polarizer 113 when the polarization state of emitted light from the optical fiber pigtail 101 is changed using the polarization controller be $P_{max}$ and $P_{min}$ respectively, the polarization degree of the light can be represented as $P=(P_{max}-P_{min})/(P_{max}+P_{min})$. Installation of various types of optical fibers that can ignore a polarization dependent loss as the optical fiber delay lines 5 is equivalent to setting of the wavelength plates of the polarization controller to various angles. Therefore, it is considered that the light power of light propagating through the polarizer 113 and the Faraday rotation element and incident on the optical fiber pigtail 102 changes from $P_{min}$ to $P_{max}$ in response to the installed optical fiber delay line.

On the other hand, the polarization degree of reflected light signal from the measured optical module is held and is P and the light power of the reflected light signal capable of interfering with polarized local light signal changes from $\alpha P_{min}$ to $\alpha P_{max}$ where $\alpha$ is a constant.

As seen from expression (8), output provided by the low-coherence reflectometer is proportional to the product of the light power of local light signal ($|E_L|^2$) and the light power of reflected light signal ($|E_r|^2$) Therefore the signal provided by measuring reflected light signal according to the invention when the polarization degree is P changes from $\alpha\beta P_{min}^2$ to $\alpha\beta P_{max}^2$ in response to the installed optical fiber delay line 5 and the pigtail of the measured optical module 3 where $\beta$ is a constant.

The average value of fluctuation signals is $\alpha\beta$ ($P_{min}^2 + P_{max}^2$)/2 and the maximum displacement from the average value of measurement signals is $\alpha\beta$ ($P_{max}^2 - P_{min}^2$)/2. Thus, there is a possibility that the measurement signal may fluctuate by the ratio of $\pm(P_{max}^2-P_{min}^2)/(P_{min}^2+P_{max}^2)/2$ with respect to the average value. If this is represented using the polarization degree P, the signal fluctuation ratio becomes $\pm 2P/(1+P^2)$. If up to signal fluctuate of ±0.5, namely, 50% is allowed, it is seen that the required polarization degree is $P=2-3^{1/2}=0.27\approx0.3$ by solving the equation $2P/(1+P^2)=0.5$. That is, if light with a polarization degree of 0.3 or less is used, the signal change can be suppressed to 50% or less if the polarization state fluctuations.

Figure 7:
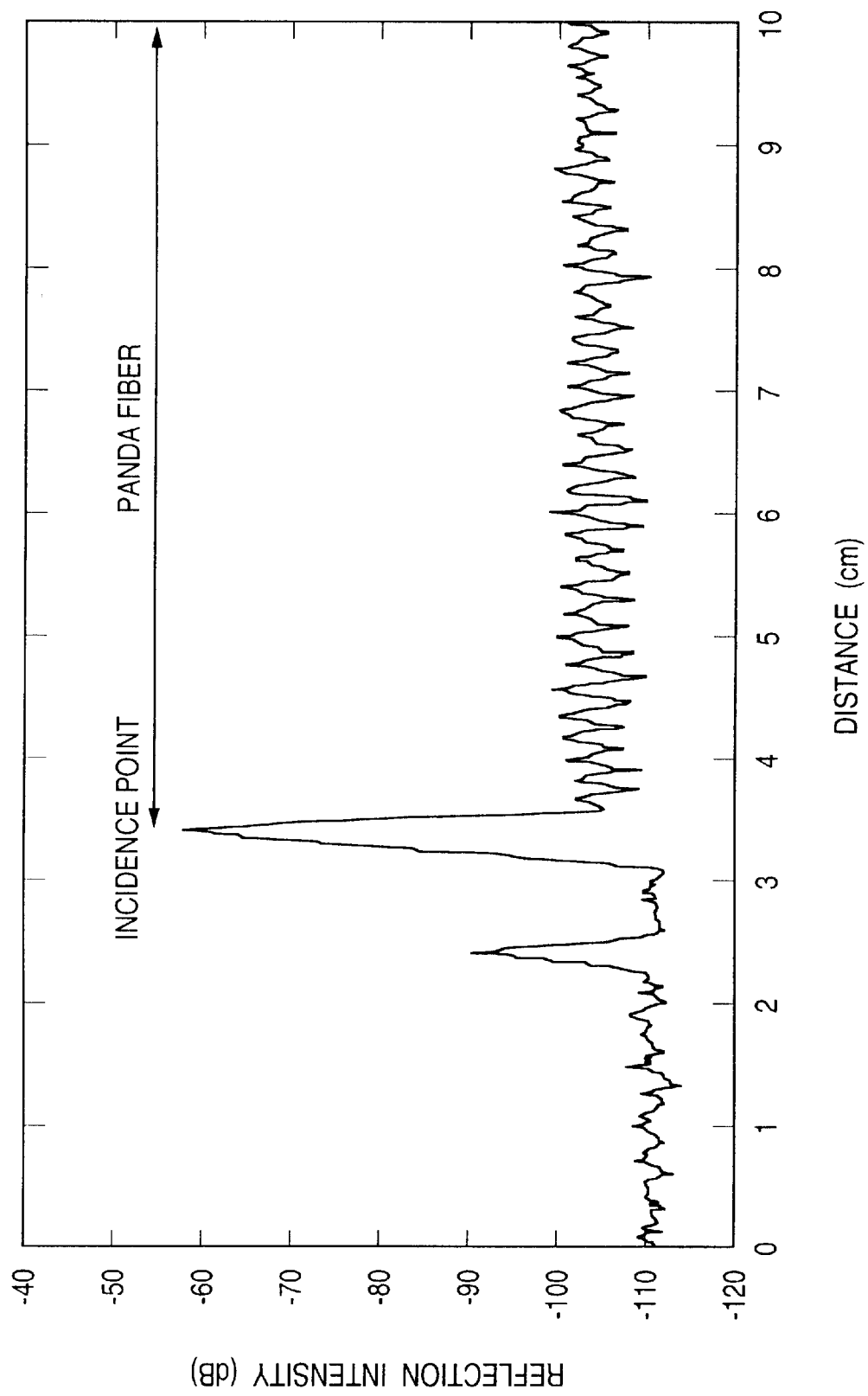
FIG. 7 is a drawing to show the measurement result of change in the length direction of I0 component of a backward Rayleigh scattering signal from a PANDA fiber.
Figure 8:
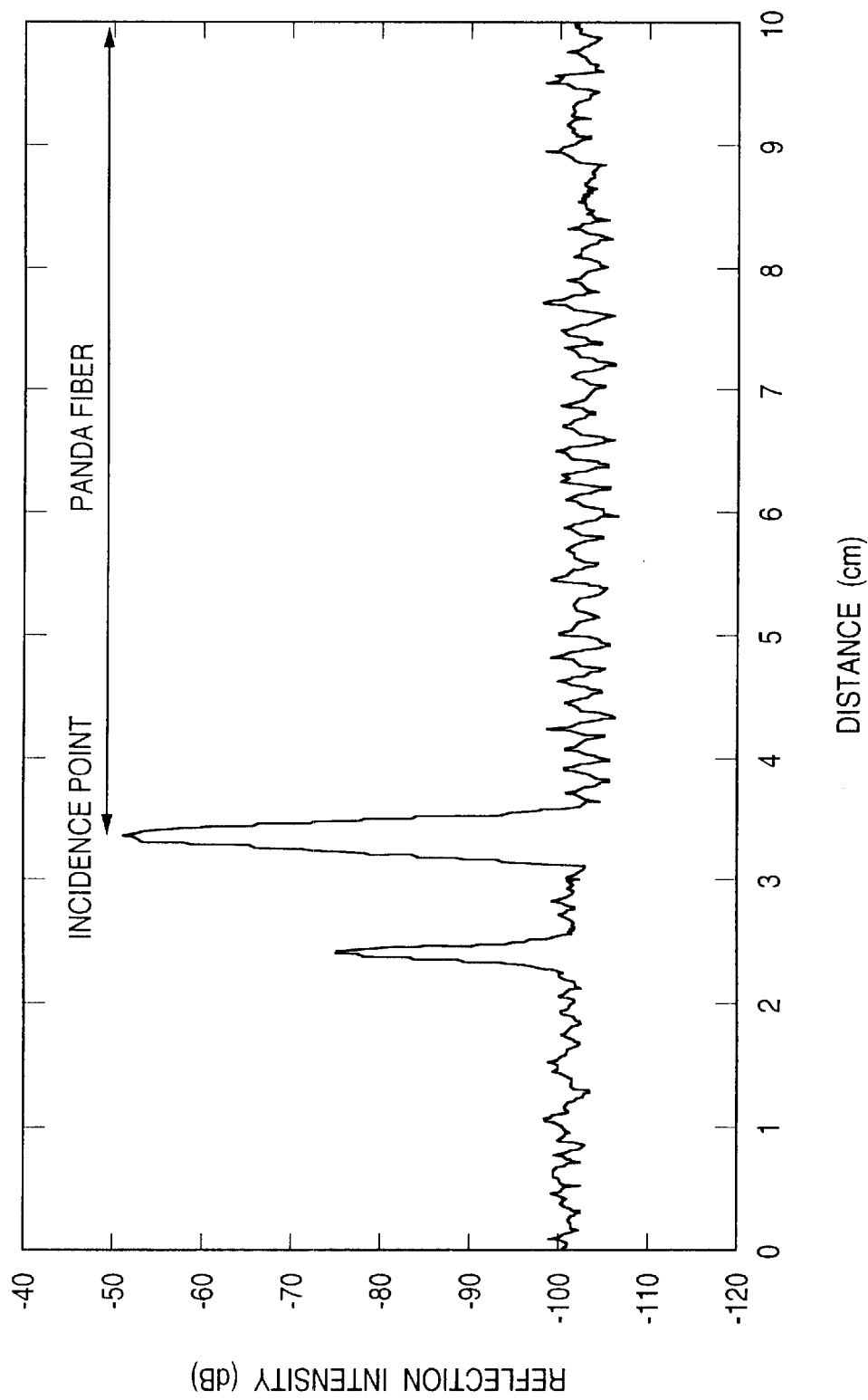
FIG. 8 is a drawing to show the measurement result of change in the length direction of I90 component of the backward Rayleigh scattering scattering signal from the PANDA fiber.
Figure 9:
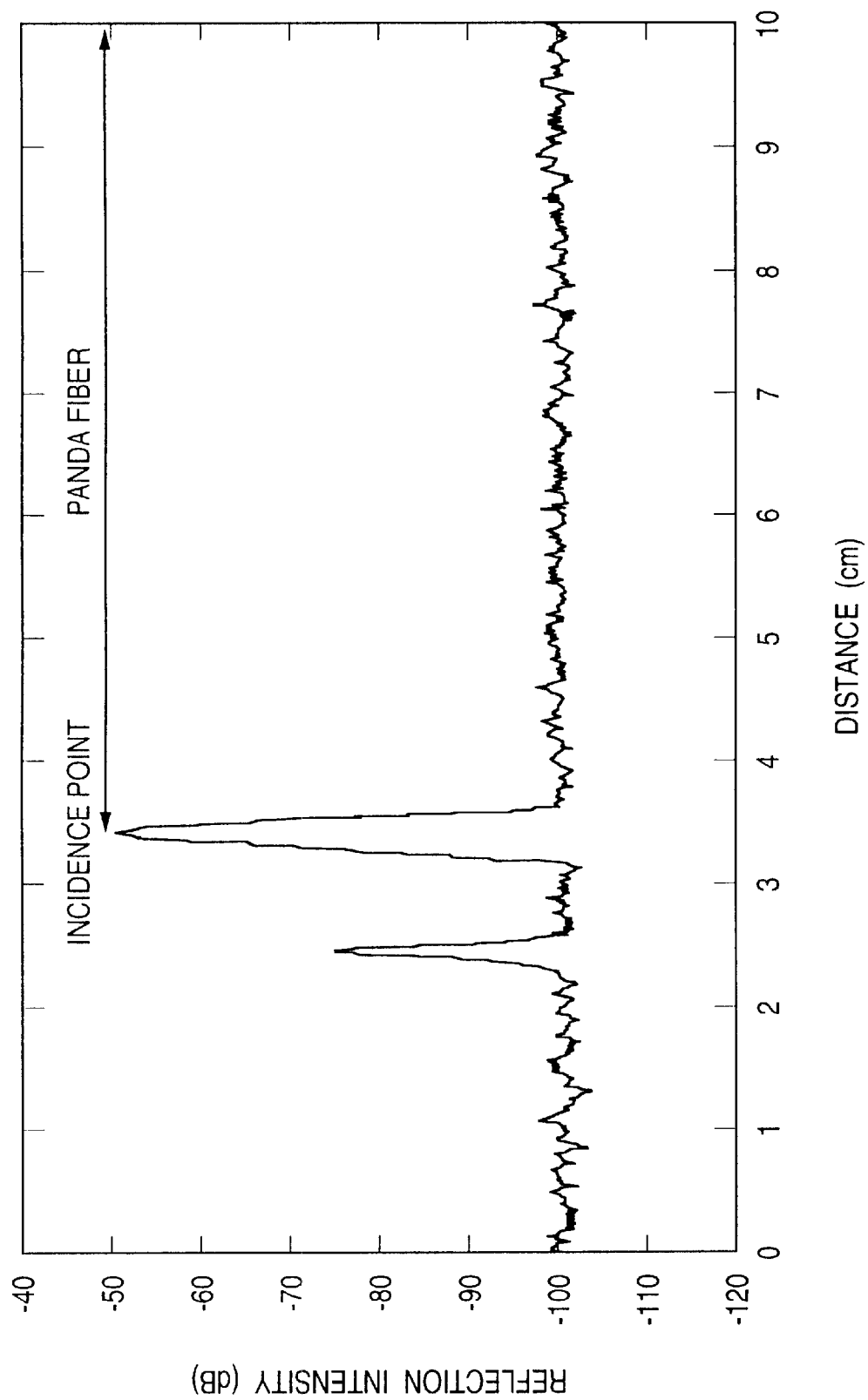
FIG. 9 is a drawing to show the measurement result of change in the length direction of I0+I90 component of the backward Rayleigh scattering signal from the PANDA fiber.

FIGS. 7 to 9 show the results of measuring fluctuations in backward Rayleigh scattering signal from a PANDA fiber of a polarization-preserving optical fiber having a double refraction property (measured optical module) in the length direction using the first embodiment. Here, FIG. 7 shows component $I_0$ for $\theta=0°$, FIG. 8 shows component $I_{90}$ for $\theta=90°$, and FIG. 9 shows $I_0+I_{90}$.

Since the measured PANDA fiber has a double refraction property, the polarization state of light propagating through the fiber changes periodically in the length direction. Thus, as shown in FIGS. 7 and 8, $I_0$ and $I_{90}$ change in the length direction in a half period of a spatial period called beat length defined by $\lambda/B$ using double refraction property B and wavelength $\lambda$ of the PANDA fiber. That is, reflection signal cannot accurately be measured simply by using $I_0$ or $I_{90}$ in the embodiment. However, $I_0+I_{90}$ is calculated as shown in FIG. 9, whereby the change in the reflection signal in the length direction thereof can be suppressed within ±1 dB. That is, if reflected light signal changes in the length direction, it is made possible to measure the reflection intensity accurately in the embodiment.

Figure 10:
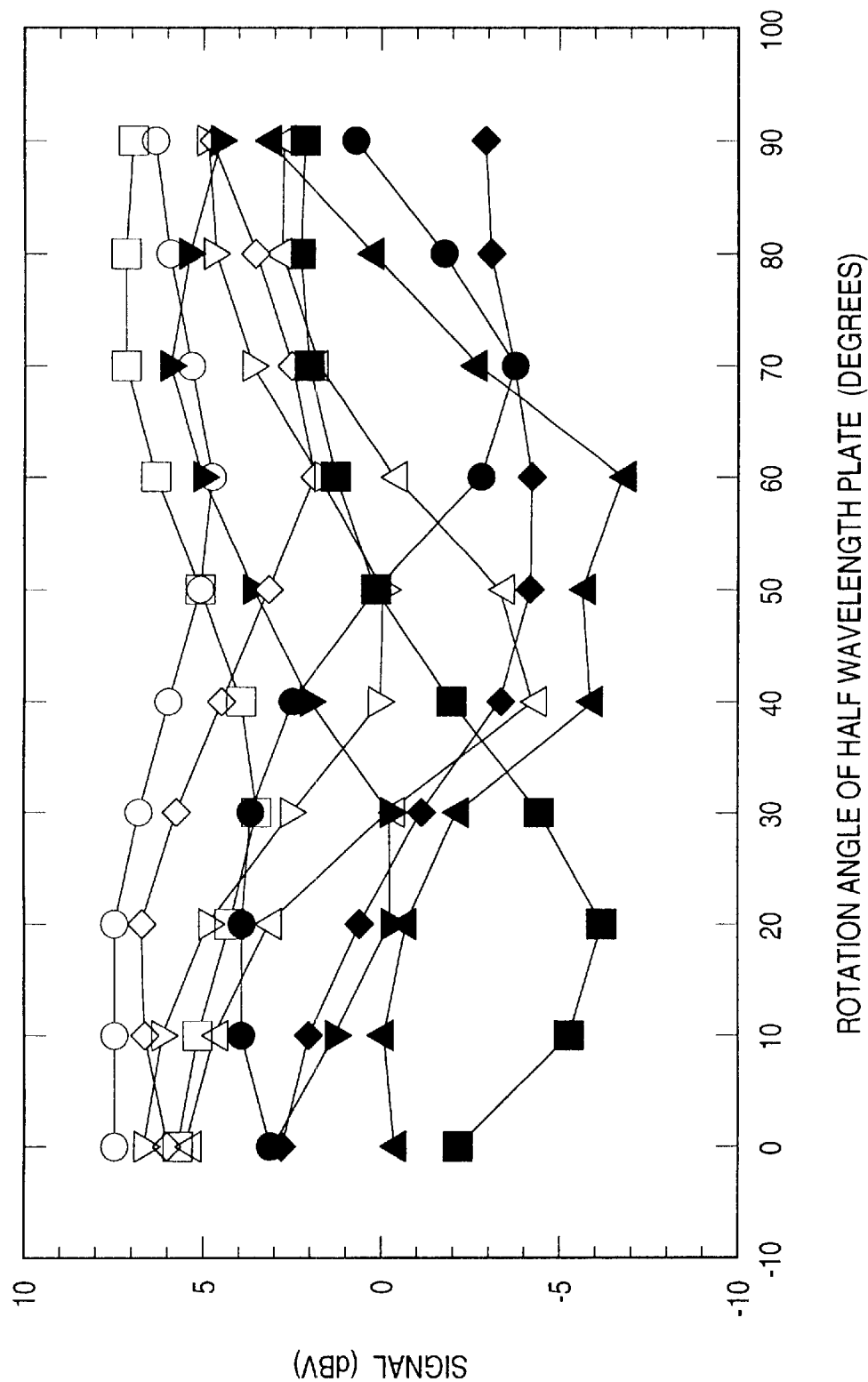
FIG. 10 is a drawing to show the measurement result of change in Fresnel reflection signal when the polarization state of local light signal is changed with a polarizer removed.

FIG. 10 shows the result of measuring change in Fresnel reflection signal $I_0+I_{90}$ when the half wavelength plate is changed in 10-degree steps from 0 degrees to 90 degrees and the quarter wavelength plate is changed in 10-degree steps from 0 degrees to 90 degrees in the polarization controller with the polarizer 113 removed in the polarization controller shown in FIG. 5. The wavelength is 1.55 $\mu$m. As seen from FIG. 10, the signal changes largely (6 dB or more) if the polarizer 113 does not exist. This indicates that it is indispensable to install the polarizer 113 to accurately measure reflected light signal power independently of the polarization state of reflected light signal or local light signal.

Figure 11:
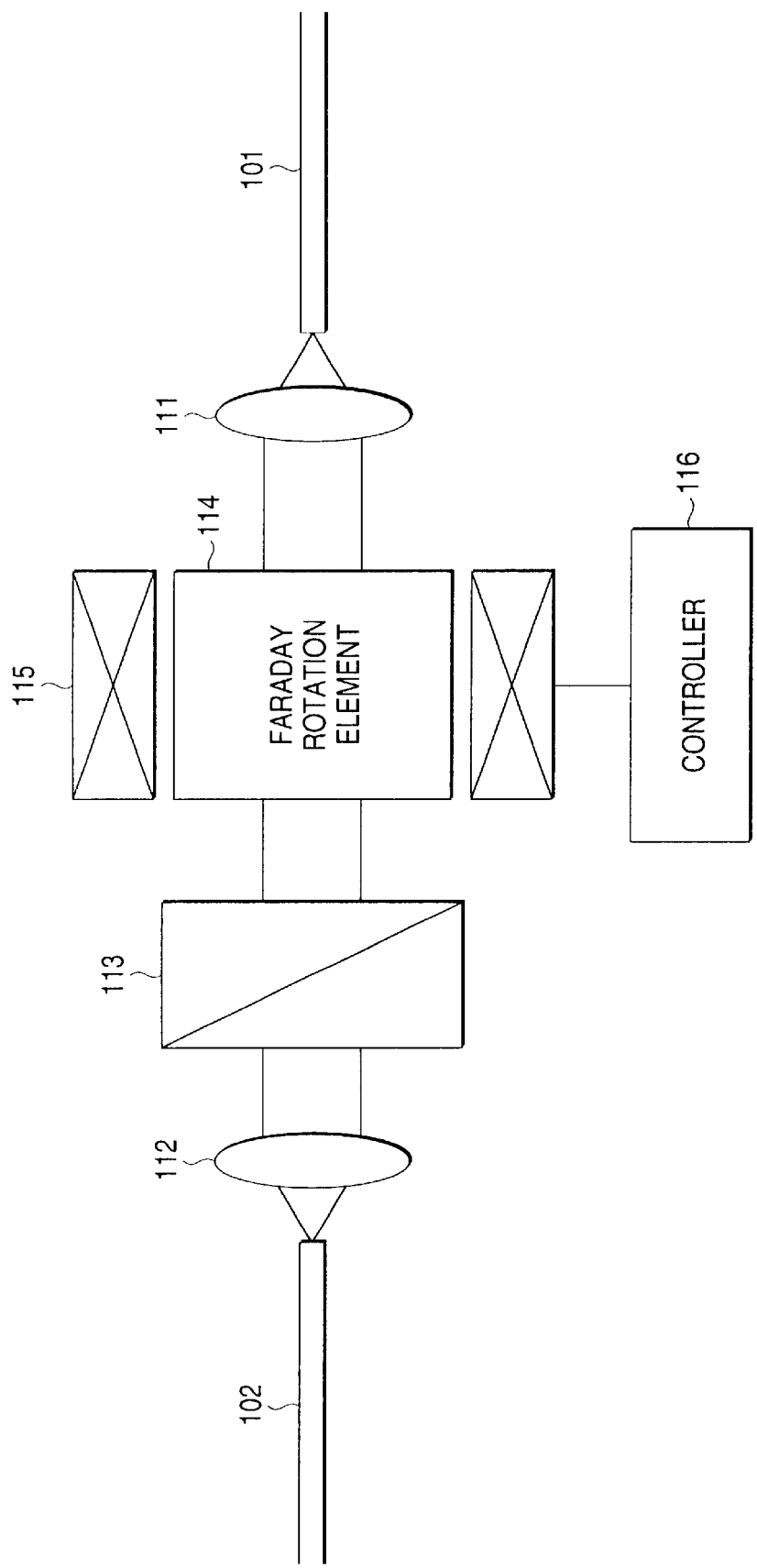
FIG. 11 is a drawing to show a second specific example of the polarization controller.

FIG. 11 shows a second specific example of the polarization controller, which differs from that shown in FIG. 5 in that the polarizer 113 is disposed just after a Faraday rotor.

Since the direction of the polarization plane of the polarizer 113 for propagating light is fixed, it is assumed that the direction is an x direction for convenience. In the state of $\theta=0°$, of emitted light from an optical fiber 101, lightwave having an electric field component in the x direction can pass through the polarizer 113. On the other hand, in the state of $\theta=90°$, light rotated 90 degrees and having an electric field component in the x direction can pass through the polarizer 113. Therefore, in setting of $\theta=0°$ an $\theta=90°$, light and light with the polarization state 90 degrees, namely, orthogonal to each other pass through the polarizer 113 and interfere with reflected light signal. The principle of the invention is as follows: Two polarization states different 90 degrees are generated and the intensities of the interference beat signals in the states are measured, then the sum of the intensities is found. Thus, in the configuration shown in FIG. 11, the light power of reflected light signal can also be measured independently of the polarization state of the reflected light signal or local light signal.

Figure 12:
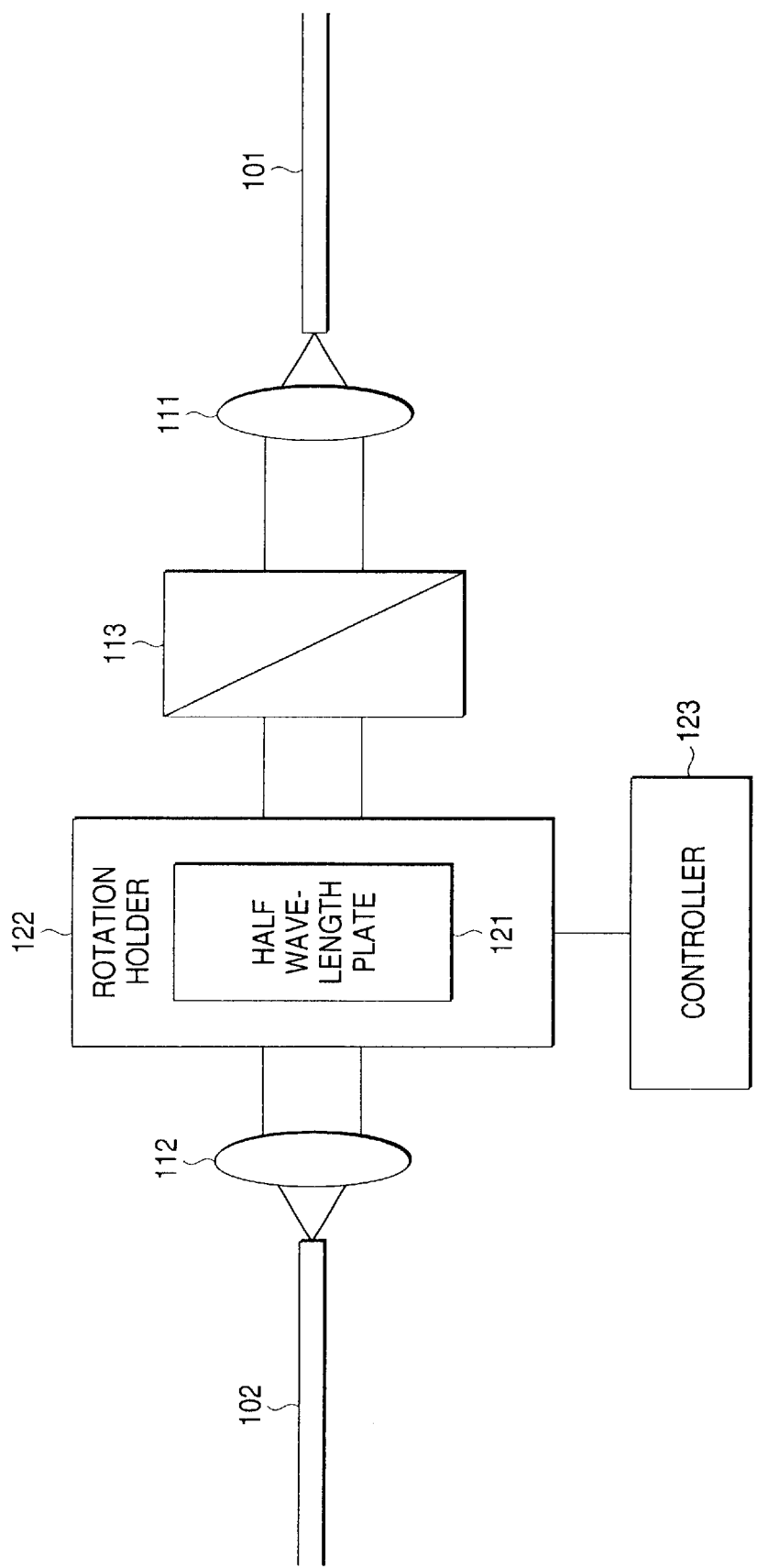
FIG. 12 is a drawing to show a third specific example of the polarization controller.

FIG. 12 shows a third specific example of the polarization controller. In the figure, numeral 121 denotes a half wavelength plate, numeral 122 denotes a rotation holder for rotating the half wavelength plate 121 in the plane perpendicular to a light beam, and numeral 123 denotes a controller.

The direction of one main axis of the half wavelength plate 121 is matched with the direction in which the polarizer 113 allows linearly polarized light to pass through, whereby the condition in which the polarization direction of the linearly polarized light does not change, namely, $\theta=0°$ can be realized. On the other hand, the direction of the main axis of the half wavelength plate 121 is set to the direction of 45 degrees with respect to the direction in which the polarizer 113 allows linearly polarized light to pass through, whereby the linearly polarized light passing through the polarizer 113 undergoes polarization rotation of 90 degrees and $\theta=0°$ can be realized.

As a result of performing the same measurement as in FIG. 6 using the example, it can be ensured that change in the measurement signal for reflected light signal is suppressed within ±0.5 dB. The polarizer 113 may be composed between the half wavelength plate 121 and a collimating lens 112.

Figure 13:
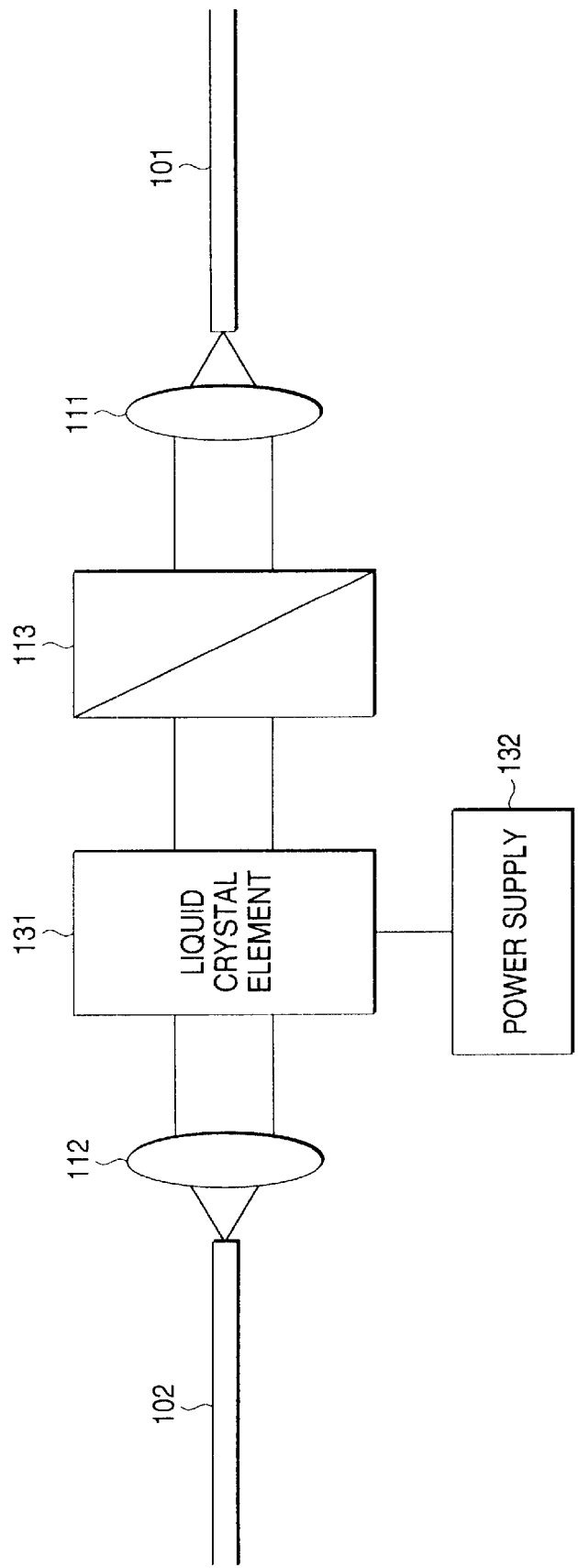
FIG. 13 is a drawing to show a fourth specific example of the polarization controller.

An alternative method of rotating linearly polarized light 90 degrees is a method of applying a voltage to liquid crystal. FIG. 13 shows a fourth specific example of the polarization controller. In the figure, numeral 131 denotes a liquid crystal element comprising a thin liquid crystal layer and optical flat of fused silica property sandwiching the thin liquid crystal layer, and numeral 132 denotes a power supply for applying a voltage to the liquid crystal element 131.

A liquid crystal molecule is uniaxial and has a double refraction property like the half wavelength plate in FIG. 12. The applied voltage to the liquid crystal element 131 is set to 0 V or a predetermined voltage, for example, 20 V, whereby the phase difference between the main axis of liquid crystal can be set to 0 or 180 degrees. Therefore, as with use of the half wavelength plate shown in FIG. 12, the voltage to the liquid crystal element 131 is adjusted, whereby polarization rotation of $\theta=0°$ (when the applied voltage is 0 V) and $\theta=90°$ (when the applied voltage is 20 V) can be realized. In FIG. 12, the half wavelength plate is mechanically rotated for realizing $\theta=90°$; the example is characterized by the fact that $\theta=90°$ can be realized by the electric operation rather than by mechanical rotation. The polarizer 113 may be composed between a collimating lens 112 and the liquid crystal element 131.

In the polarization controllers described so far, the polarizer and the polarization rotation device are housed in a single module. However, as described in "Means for Solving the Problem," the polarizer and the polarization rotation device may be composed on different paths of the path from the variable optical delay circuit to the lightwave combining section or the path from the optical measurement block to the lightwave combining section.

Figure 14:
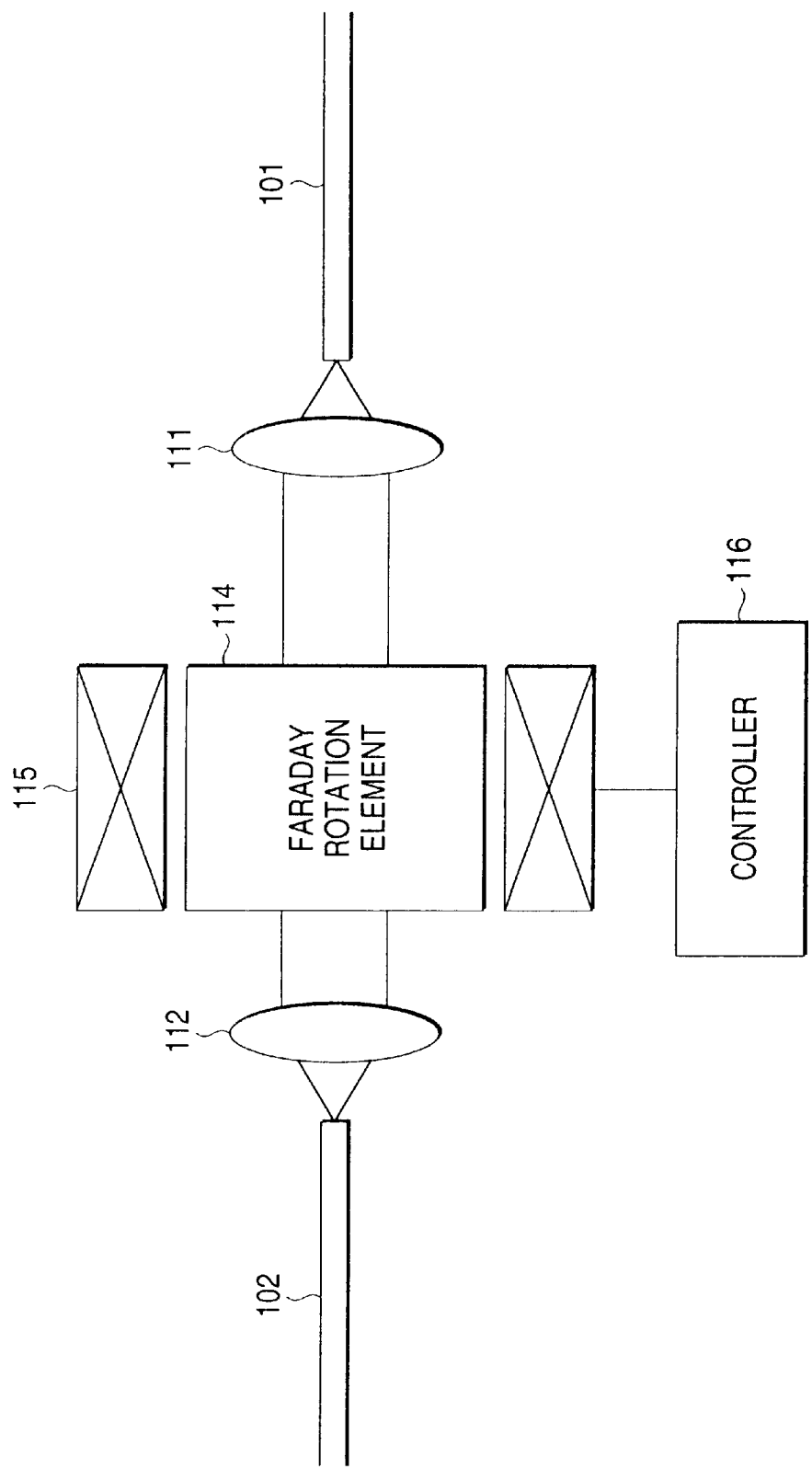
FIG. 14 is a block diagram of a polarization rotation device module.
Figure 15:
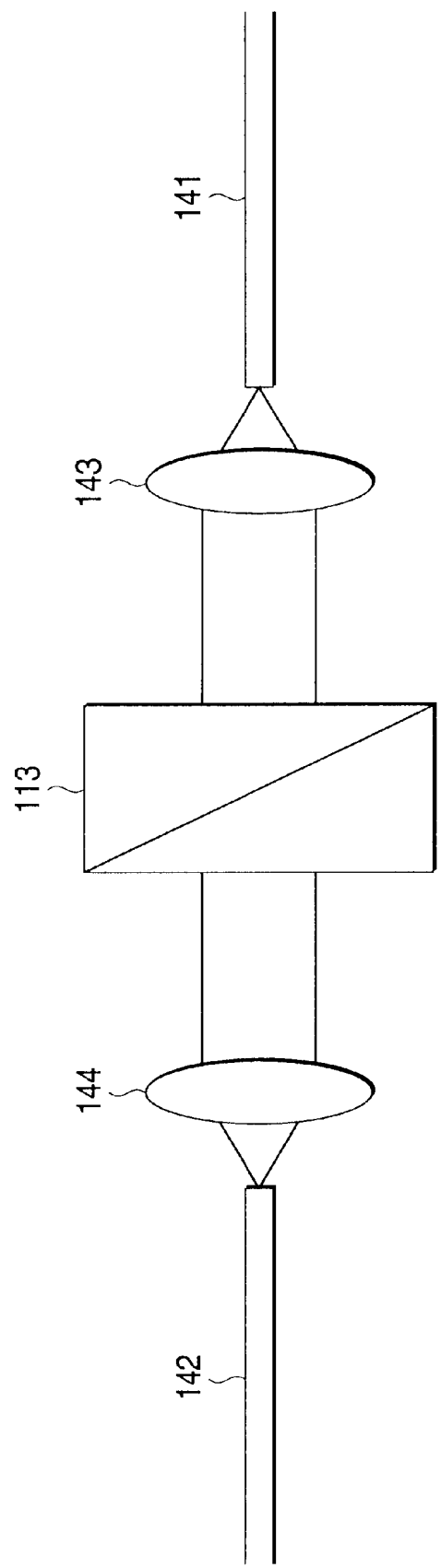
FIG. 15 is a block diagram of a polarizer module.

FIGS. 14 and 15 are drawings to show the configurations of the optical module containing only the polarization rotation device of the Faraday rotation element and the optical module containing only the polarizer respectively. That is, FIG. 14 shows the optical module with the polarizer removed from the example shown in FIG. 5 or 11. In FIG. 15, numeral 113 denotes the polarizer, numerals 141 and 142 denote optical fiber pigtails, and numerals 143 and 144 denote collimating lenses. Emitted light from the optical fiber pigtail 141 is made a collimated beam through the collimating lens 143 and propagates through the polarizer 113, then is condensed through the collimating lens 144 and is incident on the optical fiber pigtail 142.

If either of the modules is disposed on either the path from the variable optical delay circuit to the lightwave combining section or the path from the optical measurement block to the lightwave combining section in the first embodiment shown in FIG. 4, the power of reflected light signal can be measured independently of polarization. Likewise, a optical module containing only the polarization rotation device of the half wavelength plate in FIG. 12 or that of the liquid crystal element in FIG. 13 and not containing the polarizer can also be manufactured and composed on either of the paths.

Figure 16:
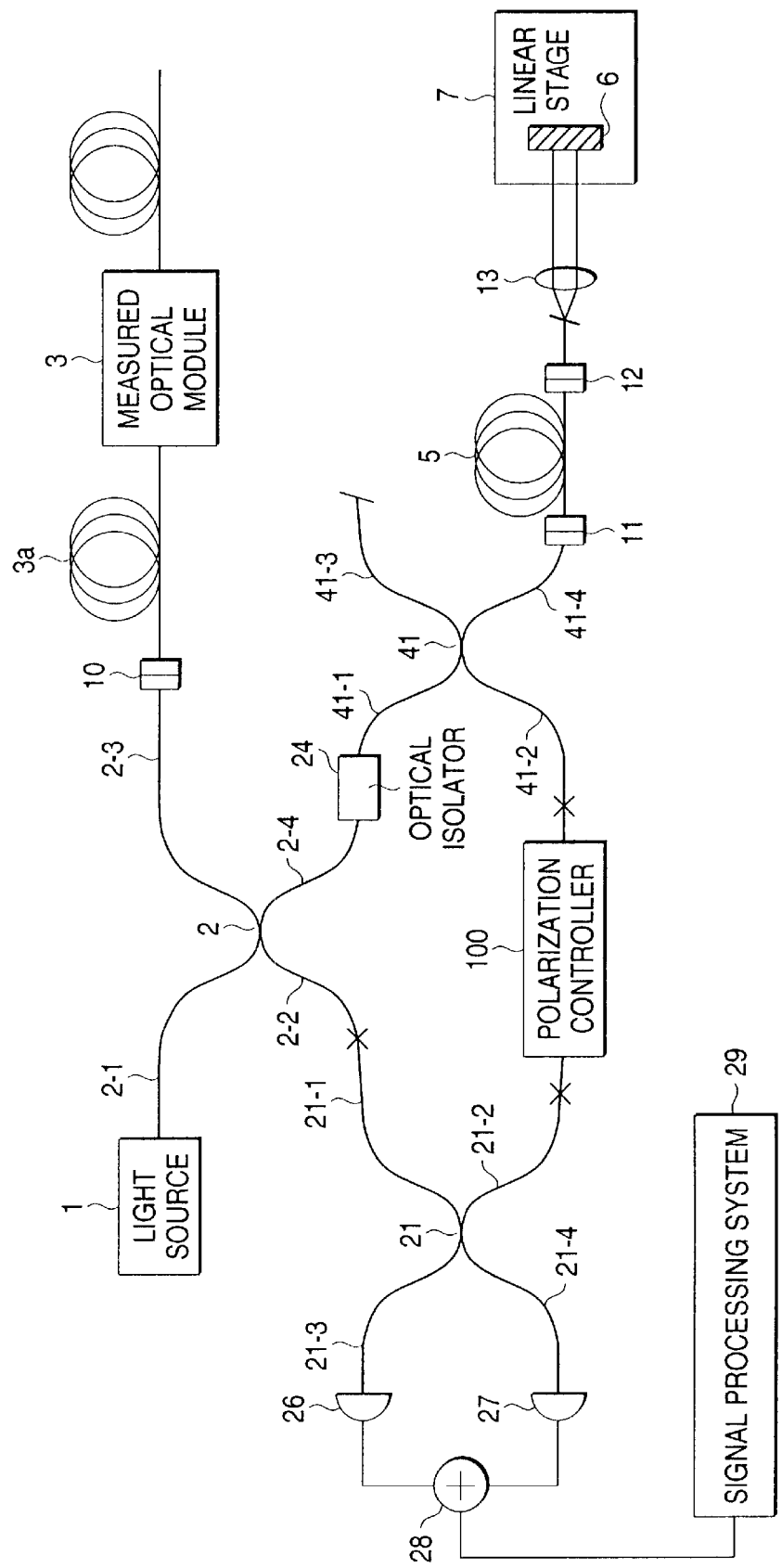
FIG. 16 is a drawing to show a second embodiment of a polarization independent reflectometer of the invention.

FIG. 16 shows a second embodiment of a polarization independent reflectometer of the invention. The second embodiment of the invention is characterized by the fact that a third optical fiber coupler is introduced to make it possible to apply a variable optical delay circuit with incidence and output ports in common as shown in FIG. 1 or 2 (consisting of an optical fiber delay line 5, a collimating lens 13, a total reflection mirror 6, and a linear stage 7) as means for changing the group delay in the first embodiment (variable optical delay circuit).

That is, in FIG. 16, numeral 41 denotes an optical fiber coupler having two input ports 41-1 and 41-2 and two output ports 41-3 and 41-4. The input port 41-1 is connected through a optical isolator 24 to an output port 2-4 of an optical fiber coupler 2, the input port 41-2 is connected through a polarization controller 100 to an input port 21-2 of an optical fiber coupler 21, and the output port 41-3 is connected to the above-mentioned variable optical delay circuit with incidence and output ports in common (here, an optical fiber delay line 5, a collimating lens 13, a total reflection mirror 6, and a linear stage 7).

In the configuration, emitted light from a light source 1 is separated into two parts through the optical fiber coupler 2. The light made to branch to the output port 2-4 propagates through a optical isolator 24, then is incident on the input port 41-1 of the optical fiber coupler 41 and is further made to branch to the output ports 41-3 and 41-4. The light made to branch to the output port 41-3 is emitted as it is and is not be used later.

The light made to branch to the output port 41-4 propagates the optical fiber delay line 5, is made a collimated beam through the collimating lens 13, and is reflected on the total reflection mirror 6. The reflected light signal propagates through the path in the opposite direction, is incident on the output port 41-4 of the optical fiber coupler 41, and is made to branch to the input ports 41-1 and 41-2. Here, the light made to branch to the input port 41-2 propagates through the polarization controller 100 and is incident on the input port 21-2 of the optical fiber coupler 21 for use as local light signal; the light made to branch to the input port 41-1 is blocked by the optical isolator 24.

In the reflectometer, the input port 2-1 of the optical fiber coupler 2 is connected to the light source 1, forming the light branch section, the output ports 21-3 and 21-4 of the optical fiber coupler 21 are connected to photodetectors 26 and 27, forming the lightwave combining section, the output port 2-3 and the input port 2-2 of the optical fiber coupler 2 and the input port 21-1 of the optical fiber coupler 21 form the optical measurement block, and the output port 2-4 of the optical fiber coupler 2, the optical isolator 24, the input ports 41-1 and 41-2 and the output port 41-4 of the optical fiber coupler 41, the optical fiber delay line 5, the collimating lens 13, the total reflection mirror 6 (containing the linear stage 7), and the input port 21-2 of the optical fiber coupler 21 form the variable optical delay circuit; they make up the interferometer.

The polarization controller 100 may adopt any of the configurations shown in FIG. 5 and FIGS. 11 to 14. The same function is provided if the polarization controller 100 is disposed at any part of the path from the variable optical delay circuit to the lightwave combining section or the path from the optical measurement block to the lightwave combining section (except light reciprocating parts (in the example, between the output port 41-4 of the optical fiber coupler 41 and the optical fiber delay line 5, between the optical fiber delay line 5 and the collimating lens 13, between the collimating lens 13 and the total reflection mirror 6, or between the output port 2-3 of the optical fiber coupler 2 and a measured optical module 3)).

In the first embodiment shown in FIG. 4, the variable optical delay circuit comprising the variable optical delay circuit with separate incidence and output ports (consisting of the collimating lenses 30 and 31, the reflector 25, the linear stage 7, and the optical fiber delay line 5) is required; whereas, in the second embodiment, the variable optical delay circuit comprising the variable optical delay circuit with incidence and output ports in common can be used.

Figure 17:
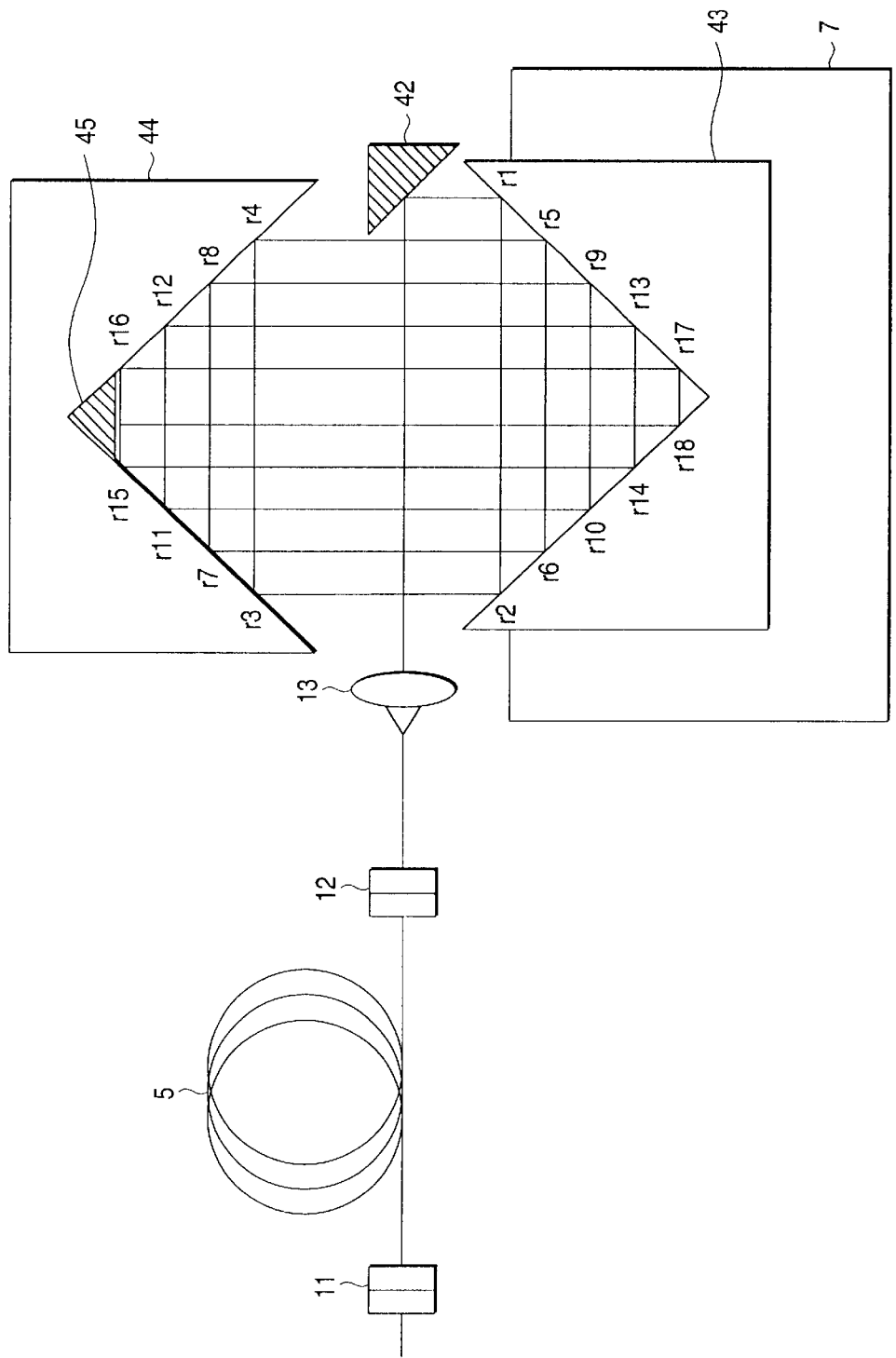
FIG. 17 is a drawing to show the configuration of a variable optical delay circuit of multiple reflection type.

Thus, the measurement range can be magnified by 10 times by using a reflection unit having a common incidence/output port and using multiple reflection, as shown in FIG. 17, in place of the total reflection mirror 6.

In FIG. 17, numeral 42 denotes a reflecting prism, numerals 43 and 44 denote retroreflectors capable of rotating incident light having any incidence angle 180 degrees in the beam direction and reflecting the rotated light in parallel with the incident light, and numeral 45 denotes a total reflection mirror.

The beam collimated through the collimating lens 13 is reflected on the prism 42 and is incident on the retroreflector 43. The incident light is reflected at two points γ1 and γ2, then is incident on the retroreflector 44, is reflected at points γ3 and γ4, and again is incident on the retroreflector 43. After this, the light is reflected on both the retroreflectors in the order of γ5, γ6, . . . γ18 and is diverted 180 degrees on the total reflection mirror 45 placed in the proximity of the center of the retroreflector 44, then is reflected in order at the γ18, γ17, . . . γ3, γ2, γ1 points of both the retroreflectors, is taken out through the prism 42, is condensed through the collimating lens 13, and again is propagated through the optical fiber delay line 5.

The retroreflector 43 is moved in the beam direction on the linear stage 7. As the retroreflector 43 is moved, the beam is diverted 10 times. On the other hand, in the example in FIG. 16 using the total reflection mirror 6, the beam is diverted only once. Therefore, the variable optical delay circuit shown in FIG. 17 is used in the second embodiment of the invention shown in FIG. 16, whereby it is made possible to magnify the measurement range 10 times.

The reflection unit shown in FIG. 17 is reported, for example, in K. Takada, H. Yamada, Y. Hibino, and S. Mitachi, "Range extension in optical low coherence reflectometry achieved using a pair of retroreflectors," Electron. Lett., vol.31, pp.1565–1566 (1995).

In the second embodiment of the invention shown in FIG. 16, the output port 41-3 of the optical fiber coupler 41 is not used. The configuration of using the output port to magnify the measurement range twice is a third embodiment of the invention shown in FIG. 18.

That is, in the figure, numeral 51 denotes an optical fiber delay line with length L=1 m and numeral 52 denotes a 2×1 light switch. If the light switch 52 is used to connect the output port 41-3 and the above-described variable optical delay circuit (5, 6, 7, 13), a reflection distribution of a measured optical module up to L=1 m can be measured. Since the length of the optical fiber delay line 51 is L=1 m, the output port 41-3 and the variable optical delay circuit are connected by the light switch 52, whereby it is made possible to measure a reflection distribution at points from L to 2L. The variable optical delay circuit (5, 7, 13, 42–45) shown in FIG. 17 can also be used in the embodiment, in which case the length L of the optical fiber delay line 51 needs to be set to 10 m.

Figure 19:
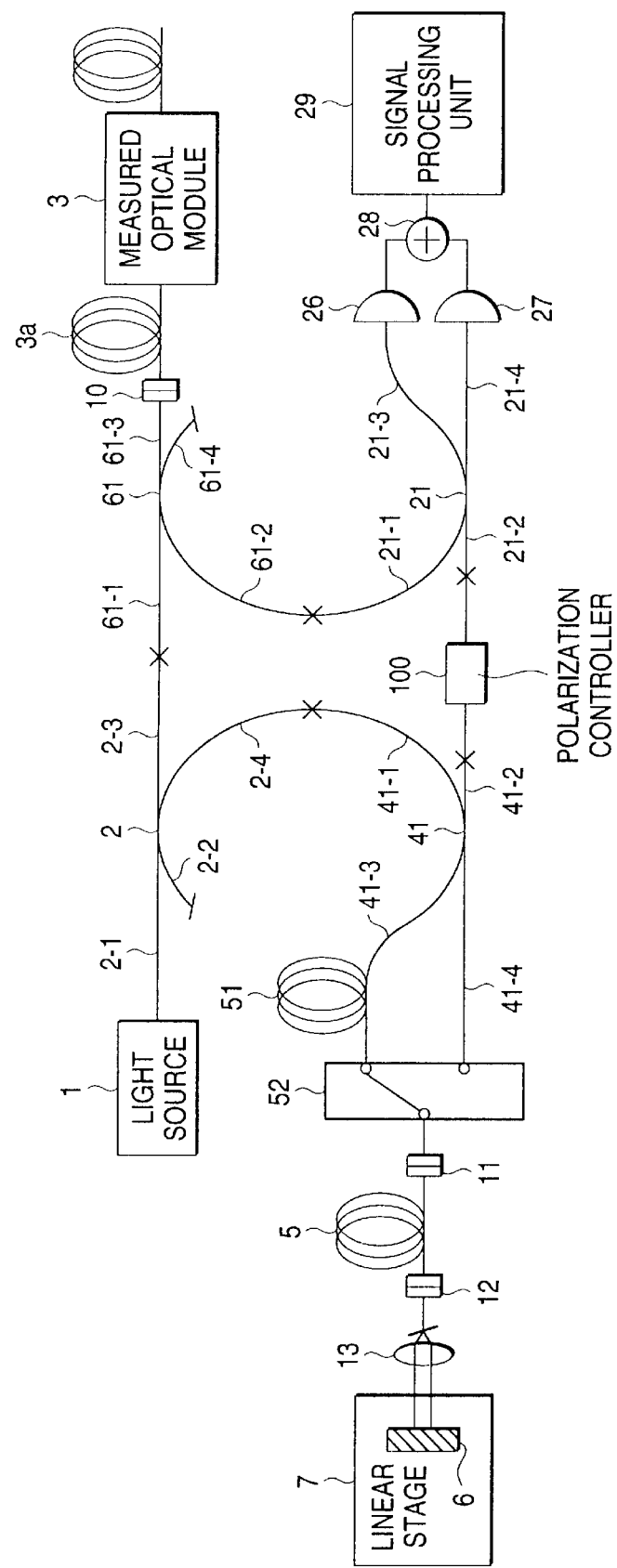
FIG. 19 is a drawing to show a fourth embodiment of a polarization independent reflectometer of the invention.

FIG. 19 shows a fourth embodiment of a polarization independent reflectometer of the invention. The fourth embodiment of the invention is characterized by the fact that a fourth optical fiber coupler is provided to eliminate the need for the optical isolator in the third embodiment.

That is, in FIG. 19, numeral 61 denotes an optical fiber coupler having two input ports 61-1 and 61-2 and two output ports 61-3 and 61-4. The input port 61-1 is connected to an output port 2-3 of an optical fiber coupler 2, the input port 61-2 is connected to an input port 21-2 of an optical fiber coupler 21, and the output port 61-3 is connected to a measured optical module 3.

In the configuration, emitted light from a light source 1 is separated into two parts through the optical fiber coupler 2. The light made to branch to one output port 2-3 is incident on the input port 61-1 of the optical fiber coupler 61 and is further made to branch to the output ports 61-3 and 61-4. The light made to branch to the output port 61-4 is emitted as it is and is not be used later.

The light made to branch to the output port 61-3 is incident on the measured optical module 3 as measurement light and the measurement light is reflected at each point responsive to the propagation distance of the measured optical module 3. The reflected light signal propagates in the opposite direction, is incident on the output port 61-3, and is emitted to the input port 61-2 of the optical fiber coupler 61.

On the other hand, the light made to branch to the other output port 2-4 of the optical fiber coupler 2 is incident on an input port 41-1 of an optical fiber coupler 41 and is further made to branch to output ports 41-3 and 41-4.

The output port 41-3 is connected through an optical fiber delay line 51 by the 2×1 switch 52 to a variable optical delay circuit (5, 6, 7, and 13) at the following stage, and the output port 41-4 is connected by the 2×1 switch 52 to the variable optical delay circuit. The light made to branch to the output port 41-3 or 41-4 is incident on the variable optical delay circuit through the optical fiber delay line 51 or as it is. Here, the light delayed for a predetermined time propagates through the path in the opposite direction, returns to the optical fiber coupler 41, and is made to branch to the input ports 41-1 and 41-2. The light made to branch to the input port 41-2 propagates through a polarization controller 100 and is incident on an input port 21-2 of the optical fiber coupler 21 for use as local light signal.

The local light signal is combined with the reflected light signal incident on the input port 21-1 of the optical fiber coupler 21 from the input port 61-2 of the optical fiber coupler 61 and the mixed lightwave signal is distributed to output ports 21-3 and 21-4 of the optical fiber coupler 21 and received at photodetectors 26 and 27. The subsequent operation is similar to that in the first to third embodiments.

In the reflectometer, the input port 2-1 of the optical fiber coupler 2 is connected to the light source 1, forming the light branch section, the output ports 21-3 and 21-4 of the optical fiber coupler 21 are connected to photodetectors 26 and 27, forming the lightwave combining section, the output port 2-3 of the optical fiber coupler 2, the input ports 61-1 and 61-2 and the output port 61-3 of the optical fiber coupler 61, and the input port 21-1 of the optical fiber coupler 21 form the optical measurement block, and the output port 2-4 of the optical fiber coupler 2, the input ports 41-1 and 41-2 and the output ports 41-3 and 41-4 of the optical fiber coupler 41, the optical fiber delay line 51, the light switch 52, an optical fiber delay line 5, the collimating lens 13, the total reflection mirror 6 (containing the linear stage 7), and the input port 21-2 of the optical fiber coupler 21 form the variable optical delay circuit; they make up the interferometer.

The polarization controller 100 may adopt any of the configurations shown in FIG. 5 and FIGS. 11 to 14. The same function is provided if the polarization controller 100 is disposed at any part of the path from the variable optical delay circuit to the lightwave combining section or the path from the optical measurement block to the lightwave combining section (except light reciprocating parts (in the example, between the output port 41-3 of the optical fiber coupler 41 and the optical fiber delay line 51, between the optical fiber delay line 51 and the light switch 52, between the output port 41-4 of the optical fiber coupler 41 and the light switch 52, between the light switch 52 and the optical fiber delay line 5, between the optical fiber delay line 5 and the collimating lens 13, between the collimating lens 13 and the total reflection mirror 6, or between the output port 61-3 of the optical fiber coupler 61 and the measured optical module 3)).

Figure 18:
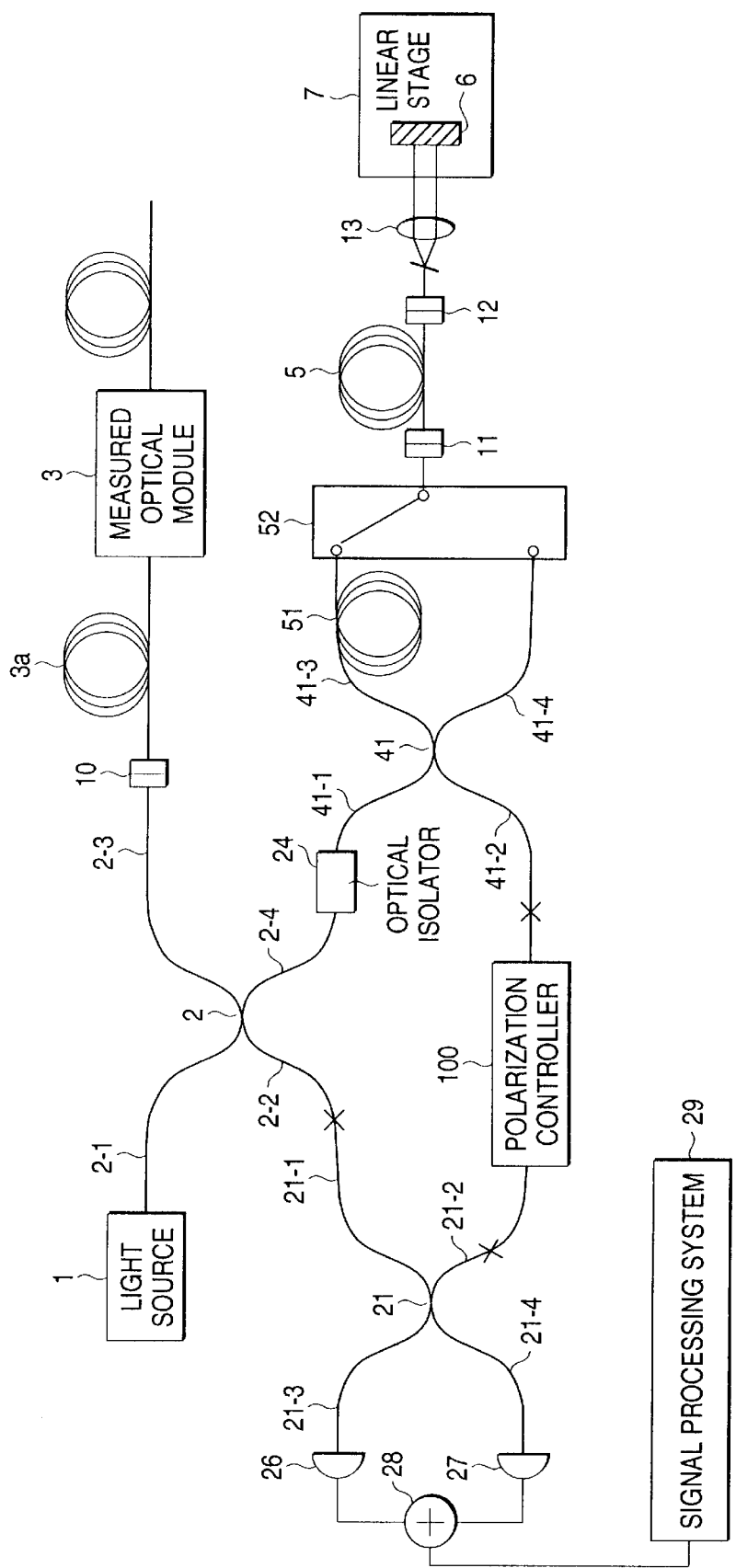
FIG. 18 is a drawing to show a third embodiment of a polarization independent reflectometer of the invention.

In the third embodiment shown in FIG. 18, the return light from the variable optical delay circuit propagates through the input port 41-1 of the optical fiber coupler 41 in the opposite direction and affects the reflected light signal from the measured optical module 3, thus the optical isolator is indispensable for blocking the return light.

On the other hand, in the fourth embodiment shown in FIG. 19, a part of the return light from the variable optical delay circuit propagates through the input port 41-1 of the optical fiber coupler 41 in the opposite direction and is incident on the output port 2-4 of the optical fiber coupler 2, but the light propagates to the input ports 2-1 and 2-2 of the optical fiber coupler 2 and does not propagate in the direction of the measured optical module 3. Thus, according to the embodiment, the optical isolator becomes unnecessary.

The purpose of installing the optical fiber delay line 51 and the 2×1 light switch 52 is to magnify the measurement range twice as in the third embodiment shown in FIG. 18, and the optical fiber delay line 51 and the 2×1 light switch 52 may be omitted.

As described above, according to the invention, the reflection intensity (distribution) of a measured optical circuit can be measured without adjusting the polarization state of the optical fiber delay line composed on the local light signal side. Thus, fully automatic reflection intensity measurement of optical waveguides and optical modules is enabled, and the invention can contribute to development of high-performance optical modules in optical module manufacturers.

What is claimed is:

1. A polarization independent reflectometry of separating low-coherence light into two parts, entering one of the parts in a measured optical circuit as measurement light and giving the other a group delay that can be changed arbitrarily as local light signal, then combining the local light signal with reflected light signal provided by reflecting the measurement light at each point responsive to a propagation distance of the measured optical circuit and causing the reflected light signal and the local light signal to interfere with each other, detecting the intensity of the interference light, and measuring a reflection intensity at each point responsive to the propagation distance of the measured optical circuit as a function of the group delay from the intensity of the interference light, wherein low-coherence light having a polarization degree of 0.3 or less is used and with the polarization degree held, the reflected light signal and the local light signal are caused to interfere with each other, wherein either the local light signal or the reflected light signal is disposed in a linear polarization state, intensities I0 and I90 of interference light when the polarization state of either the local light signal or the reflected light signal is rotated θ=0° and θ=90° in a predetermined delay amount are measured, I0+I90 is found, and the reflection intensity at the point responsive to the propagation distance of the measured optical circuit corresponding to the predetermined group delay is measured.

2. A polarization independent reflectometer, comprising:

a light source for generating low-coherence light having a polarization degree of 0.3 or less;

an interferometer adapted to hold the polarization degree of propagation light and including a light branch section for separating a low-coherence light from said light source into two parts; a optical measurement block for entering one of the branch parts in a measured optical circuit as measurement light and taking out reflected light signal provided by reflecting the measurement light at each point responsive to a propagation distance of the measured optical circuit; a variable optical delay circuit for giving the other a group delay that can be changed arbitrarily as local light signal; and a lightwave combining section for combining the local light signal from the variable optical delay circuit and the reflected light signal from the optical measurement block and causing the local light signal and the reflected light signal to interfere with each other;

a detection system for detecting the intensity of the interference light output from said interferometer, in which a reflection intensity at each point responsive to the propagation distance of the measured optical circuit is measured as a function of the group delay from the intensity of the interference light detected;

a polarizer composed on one of a path from the variable optical delay circuit to the lightwave combining section and a path from the optical measurement block to said lightwave combining section except light reciprocating parts;

a polarization rotation device for arbitrarily rotating the polarization state of propagation light 0 degrees and 90 degrees, said polarization rotation device composed on one of the path from the variable optical delay circuit to said lightwave combining section and the path from the optical measurement block to said lightwave combining section except light reciprocating parts; and a signal processing system provided for detecting the intensities of interference light by said detection system when the polarization state is rotated 0 degrees and 90 degrees by said polarization rotation device with a predetermined group delay given by the variable optical delay circuit and adding the intensities of interference light, to measure the reflection intensity at the point responsive to the propagation distance of the measured optical circuit corresponding to the predetermined group delay.

3. The polarization independent reflectometer as claimed in claim 2 wherein first and second optical couplers each having two input ports and two output ports are disposed so as to connect one input port of said first optical coupler to said light source for providing said light branch section and to connect at least one output port of said second optical coupler to said detection system for providing said lightwave combining section;

wherein one output port of said first optical coupler is connected to said measured optical circuit and the other input port of said first optical coupler is connected to one input port of the second optical coupler for providing the optical measurement block;

wherein the other output port of said first optical coupler is connected to the other input port of said second optical coupler through a variable optical delay circuit having separate incidence and output ports for providing the variable optical delay circuit.

4. The polarization independent reflectometer as claimed in claim 2 wherein first, second, and third optical couplers each having two input ports and two output ports are used and one input port of the first optical coupler is connected to said light source for providing the light branch section and at least one output port of the second optical coupler is connected to said detection system for providing the lightwave combining section;

wherein one output port of the first optical coupler is connected to the measured optical circuit and the other input port of the first optical coupler is connected to one input port of the second optical coupler for providing the optical measurement block; and wherein the other output port of the first optical coupler is connected to one input port of the third optical coupler through a optical isolator, one output port of the third optical coupler is connected to a variable optical delay circuit with incidence and output ports in common, and the other input port is connected to the other input port of the second optical coupler for providing the variable optical delay circuit.

5. The polarization independent reflectometer as claimed in claim 2 wherein first, second, third, and fourth optical couplers each having two input ports and two output ports are used and one input port of the first optical coupler is connected to said light source for providing the light branch section and at least one output port of the second optical coupler is connected to said detection system for providing the lightwave combining section, wherein one output port of the first optical coupler is connected to one input port of the fourth optical coupler, one output port of the fourth optical coupler is connected to the measured optical circuit, and the other input port of the fourth optical coupler is connected to one input port of the second optical coupler for providing the optical measurement block; and wherein the other output port of the first optical coupler is connected to one input port of the third optical coupler, one output port of the third optical coupler is connected to a variable optical delay circuit with incidence and output ports in common, and the other input port is connected to the other input port of the second optical coupler for providing the variable optical delay circuit.

6. The polarization independent reflectometer as claimed in claim 4 wherein a 2×1 light switch is used, one output port of the third optical coupler is connected to one terminal of the 2×1 light switch, the other output port is connected to another terminal of the 2×1 light switch through a optical delay line, and one of the terminals is connected to the variable optical delay circuit with incidence and output ports in common.

7. The polarization independent reflectometer as claimed in claim 2 wherein said polarization rotation device comprises a Faraday rotation element, a coil part for applying a magnetic field to the Faraday rotation element in a beam propagation direction, and a current control section for controlling an electric current to the coil part is used.

8. The polarization independent reflectometer as claimed in claim 2 wherein a polarization rotation device comprising a half wavelength plate and a rotation mechanism for rotating the half wavelength plate in a plane orthogonal to an optical axis is used.

9. The polarization independent reflectometer as claimed in claim 2 wherein said polarization rotation device comprises a liquid crystal element enabling the optical path difference between two main axis to be set to either 0 or half wavelength and a power supply for adjusting voltage to the liquid crystal element is used.

10. A polarization independent reflectometer wherein a polarization controller comprising the polarization rotation device in the polarization independent reflectometer as claimed in any of claims 7 to 9 and a polarizer being placed in a beam propagation path is used.

* * * * *

UNITED STATES PATENT AND TRADEMARK OFFICE
CERTIFICATE OF CORRECTION

PATENT NO. : 6,476,919 B1
DATED : November 5, 2002
INVENTOR(S) : Tohru Mori et al.

It is certified that error appears in the above-identified patent and that said Letters Patent is hereby corrected as shown below:

<u>Title page,</u>
Item [73], Assignee, after "Telephone" insert -- Corporation --.
"Ntt Electronics" should read -- NTT Electronics --.

<u>Column 16,</u>
Line 49, "a optical" should read -- an optical --.

<u>Column 17,</u>
Line 57, "a optical" should read -- an optical --.

<u>Column 18,</u>
Line 31, "a optical" should read -- an optical --.

Signed and Sealed this

Nineteenth Day of August, 2003

JAMES E. ROGAN
*Director of the United States Patent and Trademark Office*